US011039426B2

(12) United States Patent
Baghel et al.

(10) Patent No.: US 11,039,426 B2
(45) Date of Patent: Jun. 15, 2021

(54) VARIABLE SIZE PHYSICAL SIDELINK CONTROL CHANNEL AND AGGREGATION

(71) Applicant: QUALCOMM Incorporated, San Diego, CA (US)

(72) Inventors: Sudhir Kumar Baghel, Hillsborough, NJ (US); Kapil Gulati, Hillsborough, NJ (US); Tien Viet Nguyen, Bridgewater, NJ (US); Shailesh Patil, San Diego, CA (US); Arjun Bharadwaj, Poway, CA (US); Shuanshuan Wu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 4 days.

(21) Appl. No.: 16/565,042

(22) Filed: Sep. 9, 2019

(65) Prior Publication Data

US 2020/0107312 A1 Apr. 2, 2020

Related U.S. Application Data

(60) Provisional application No. 62/737,710, filed on Sep. 27, 2018.

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0048* (2013.01); *H04L 27/2601* (2013.01); *H04W 72/085* (2013.01); *H04W 72/044* (2013.01)

(58) Field of Classification Search
CPC ... H04L 5/0042; H04L 5/0044; H04L 5/0053; H04L 5/0051; H04W 4/40; H04W 72/10;
(Continued)

(56) References Cited

U.S. PATENT DOCUMENTS

2017/0273128 A1 9/2017 Abedini et al.
2017/0289733 A1* 10/2017 Rajagopal ............... H04W 4/70
(Continued)

FOREIGN PATENT DOCUMENTS

CN 107370561 A 11/2017
EP 3352511 A1 7/2018

OTHER PUBLICATIONS

International Search Report and Written Opinion—PCT/US2019/050454—ISA/EPO—dated Nov. 11, 2019.

*Primary Examiner* — Jung Liu
(74) *Attorney, Agent, or Firm* — Procopio, Cory, Hargreaves & Savitch LLP/Qualcomm

(57) ABSTRACT

Using a modulation and coding scheme for a control channel that is more conservative than needed to fulfill the control function may waste resources. To address this issue, a variable size control channel is provided. An apparatus in such a system may be configured to determine an aggregation level of a plurality of aggregation levels associated with a control channel. Each aggregation level of the plurality of aggregation levels is associated with a number of time-frequency resources dedicated for the control channel and a particular modulation and coding scheme used for modulating and coding control information in the control channel. The apparatus is configured to receive control information in the time-frequency resources associated with the aggregation level and decode the control information received in the time-frequency resources associated with the determined aggregation level. The decoding is based on the particular modulation and coding scheme associated with the determined aggregation level.

30 Claims, 19 Drawing Sheets

(51) Int. Cl.
*H04L 27/26* (2006.01)
*H04W 72/08* (2009.01)

(58) Field of Classification Search
CPC ... H04W 92/18; H04W 72/04; H04W 72/048;
H04W 72/0446; H04W 72/0453; H04W
4/22; H04W 72/02; H04W 76/14; H04W
4/90; H04J 11/00; H04J 2211/005
See application file for complete search history.

(56) References Cited

U.S. PATENT DOCUMENTS

| | | |
|---|---|---|
| 2017/0295601 A1* | 10/2017 | Kim .................. H04W 72/0406 |
| 2017/0366328 A1* | 12/2017 | Seo ........................ H04L 5/0055 |
| 2017/0367087 A1* | 12/2017 | Seo ........................ H04W 72/10 |
| 2018/0176892 A1* | 6/2018 | Kim .................... H04W 52/386 |
| 2018/0199388 A1* | 7/2018 | Tabet ................ H04W 72/0446 |
| 2018/0220455 A1 | 8/2018 | Baghel et al. |
| 2018/0234220 A1* | 8/2018 | Yasukawa ............ H04W 72/04 |
| 2019/0007175 A1* | 1/2019 | Kwak .................... H04B 1/713 |
| 2019/0014490 A1* | 1/2019 | Kim ...................... H04W 24/02 |
| 2019/0090218 A1* | 3/2019 | Noh .................. H04W 72/1289 |
| 2019/0200389 A1* | 6/2019 | Li ........................ H04B 7/0695 |
| 2019/0363843 A1* | 11/2019 | Gordaychik ........ H04W 72/042 |
| 2019/0364585 A1* | 11/2019 | Lee ........................ H04W 72/12 |
| 2020/0037343 A1* | 1/2020 | He .......................... H04W 4/40 |
| 2020/0178288 A1* | 6/2020 | Chang ............. H04W 72/0446 |
| 2020/0196255 A1* | 6/2020 | Cheng ................. H04W 56/001 |
| 2020/0214002 A1* | 7/2020 | Lee .................. H04W 72/0486 |
| 2020/0280362 A1* | 9/2020 | Garcia ............. H04W 72/1226 |
| 2020/0280966 A1* | 9/2020 | Baldemair ............ H04L 1/0009 |
| 2020/0295810 A1* | 9/2020 | Baldemair ........... H04B 7/0478 |
| 2020/0304233 A1* | 9/2020 | Garcia ................. H04L 45/745 |

\* cited by examiner

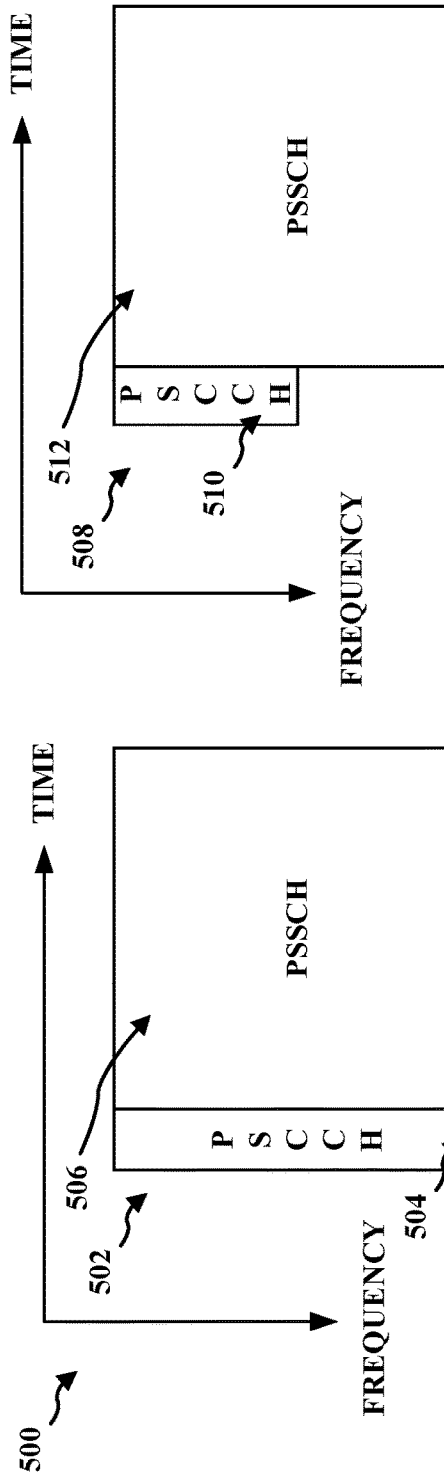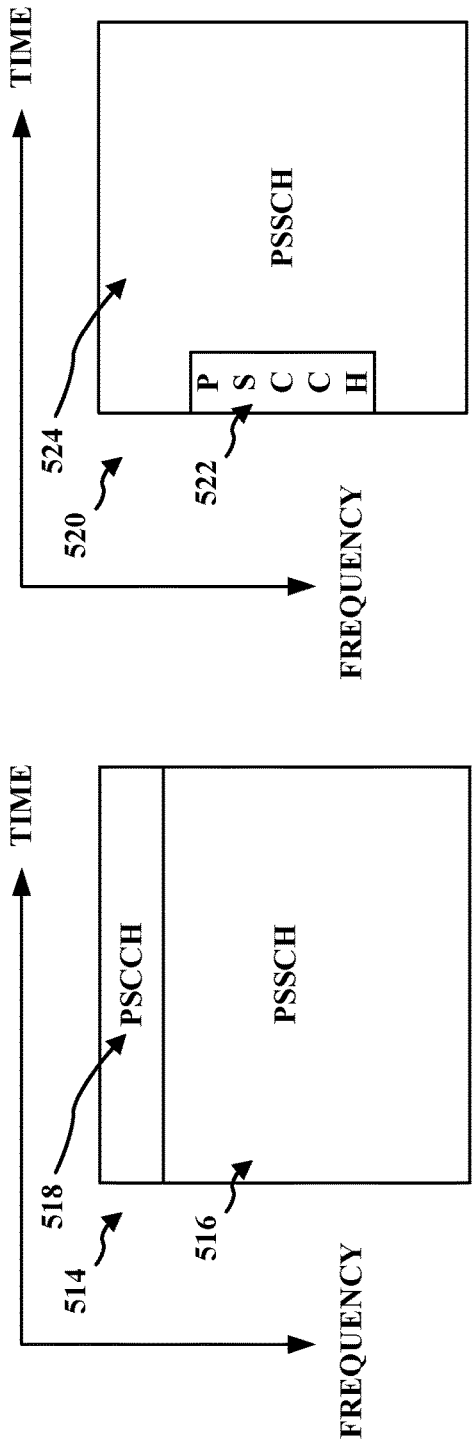

VARIABLE SIZE PHYSICAL SIDELINK CONTROL CHANNEL AND AGGREGATION

CROSS-REFERENCE TO RELATED APPLICATION(S)

This application claims the benefit of U.S. Provisional Application Ser. No. 62/737,710, entitled "VARIABLE SIZE PHYSICAL SIDELINK CONTROL CHANNEL AND AGGREGATION" and filed on Sep. 27, 2018, which is expressly incorporated by reference herein in its entirety.

BACKGROUND

Technical Field

The present disclosure relates generally to communication systems, and more particularly, to vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Depending on the application of data carried in V2X communications and any requirements for fitting the data into a given set of resources, the data channel (e.g. physical sidelink shared channel (PSSCH)) may vary in the amount of data being carried as well as in the modulation coding scheme (MCS) used to modulate the data being carried. Thus, a UE may need to decide an MCS that the UE will need to use to achieve a certain link budget for successful V2X communication. Since the link budget for the control channel (e.g. physical sidelink control channel (PSCCH)) should generally be better than that of the data channel, the UE may need to use a more robust (e.g. higher) MCS for communication in the control channel.

However, if the control channel utilizes a fixed amount of resources and the data channel has a small MCS, the control channel may have to use a conservative (e.g. low) MCS to achieve a link budget better than that of the data channel. Since more resources would need to be allocated to accommodate the same number of bits that a higher MCS could provide in fewer resources, over-provisioning of resources for the control channel may result. While the control channel's link budget may be better in consequence, such over-provisioning may unnecessarily increase the number of resources a UE would have to decode to obtain the data, reducing the likelihood of successful decoding and limiting the usefulness of the access link budget.

Accordingly, the present disclosure provides a variable size control channel in V2X communication. The control channel may be PSCCH. In some cases, a less robust transmission (e.g. a smaller link budget) may be required for the control channel. In these cases, the variable size control channel may be configured at minimum as spanning only one basic unit (i.e. one subchannel in frequency and one symbol in time). However, in other cases a more robust transmission (e.g. a larger link budget) may be required for the control channel. In such cases, the basic unit may be aggregated in time and frequency to span additional symbols and/or subchannels in the variable-size control channel. By allowing for these additional resources (e.g. different aggregation levels) to be variably configured based on the link budget, the present disclosure allows the robustness of the control channel to increase when a larger link budget is required and to decrease when a smaller link budget is sufficient. Since the MCS can be configured accordingly (lower or higher) due to the different aggregation levels in the variable control channel, over-provisioning of resources in a fixed control channel may be eliminated and improved decoding of data may result.

In an aspect of the disclosure, a method, a computer-readable medium, and an apparatus are provided. The apparatus may be a user equipment (UE) (e.g. a receiving device) configured to determine an aggregation level of a plurality of aggregation levels associated with a PSCCH. Each aggregation level of the plurality of aggregation levels may be associated with a number of time-frequency resources dedicated for the PSCCH and a particular MCS used for modulating and coding control information in the PSCCH. The apparatus may be configured to receive control information in the time-frequency resources associated with the aggregation level. The apparatus may be configured to decode the control information received in the time-frequency resources associated with the determined aggregation level.

In an aspect, the decoding is based on the particular MCS associated with the determined aggregation level.

In an aspect of the disclosure, a method, a computer-readable medium, and an apparatus are provided. The apparatus may be a UE (e.g. a transmitting device) configured to determine an aggregation level of a plurality of aggregation levels associated with a PSCCH. Each aggregation level of the plurality of aggregation levels is associated with a number of time-frequency resources dedicated for the PSCCH and a particular MCS used for modulating and coding control information in the PSCCH. The apparatus may be configured to encode control information with the MCS associated with the determined aggregation level and transmit the control information in the time-frequency resources associated with the determined aggregation level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5D are diagrams illustrating examples of control and data multiplexing over time and frequency resources.

DETAILED DESCRIPTION

Figure 1:
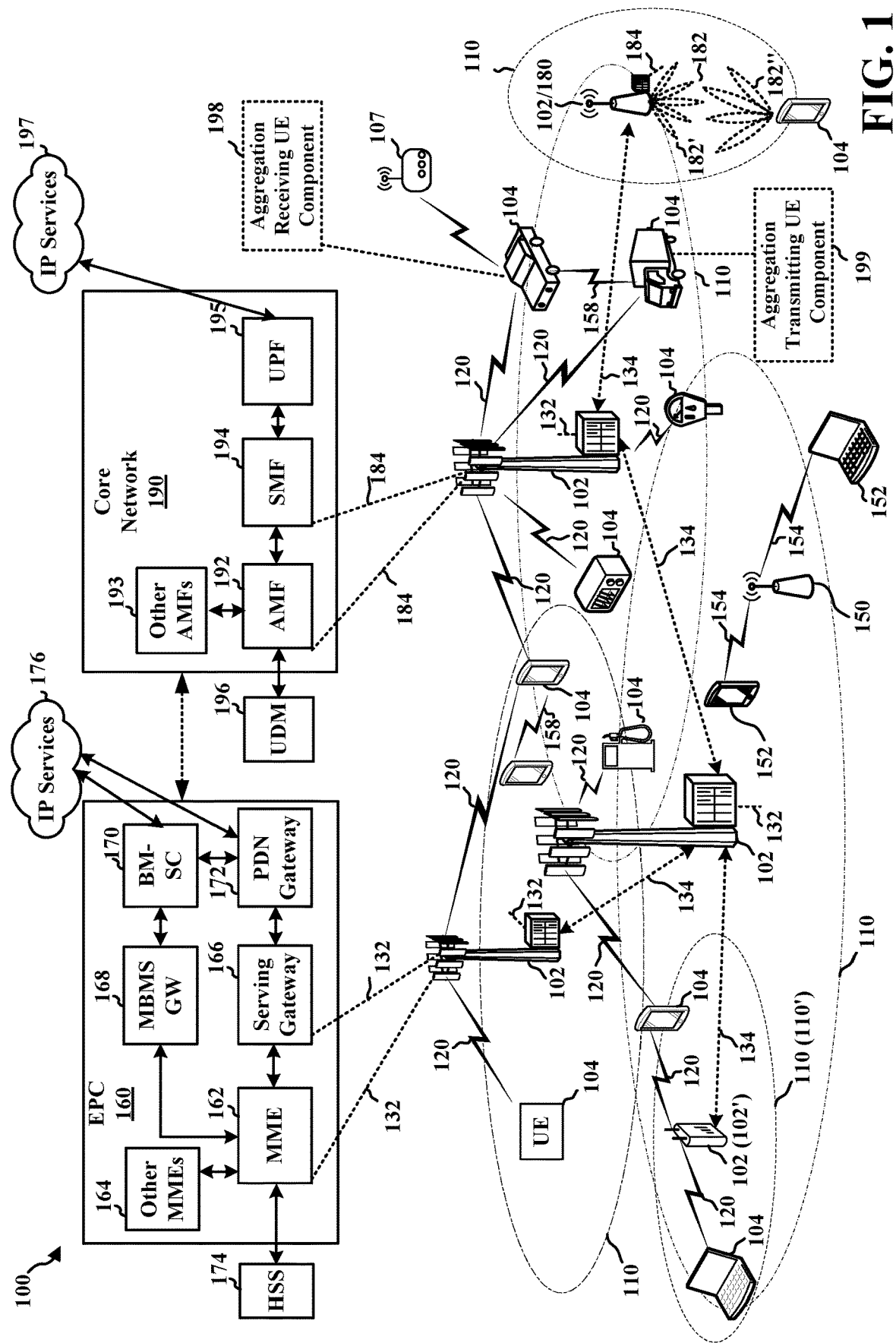
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Using a MCS for a control channel that is more conservative than needed to fulfill the control function may waste resources. For example, using an MCS for a control channel in a D2D communication over a D2D communication link 158 that is more conservative than needed to fulfill the control function may waste resources. To address this issue, some systems may allow for a variable size control channel. For example, some systems may allow for a variable size control channel for D2D communication over a D2D communication link 158. Referring again to FIG. 1, in certain aspects, the UE 104 illustrated as being within, for example, the representation of the car or the representation of the truck illustrated in FIG. 1, may comprise an aggregation receiving UE component 198 configured to determine an aggregation level of a plurality of aggregation levels associated with a PSCCH. Each aggregation level of the plurality of aggregation levels may be associated with a number of time-frequency resources dedicated for the PSCCH and a particular MCS used for modulating and coding control information in the PSCCH. The aggregation receiving UE component 198 may be configured to receive control information in the time-frequency resources associated with the aggregation level and decode the control information received in the time-frequency resources associated with the determined aggregation level. The decoding is based on the particular MCS associated with the determined aggregation level (198).

Accordingly, another UE 104 illustrated as being within, for example, the representation of the truck or the representation of the car illustrated in FIG. 1, may comprise an aggregation transmitting UE component 199 configured to determine an aggregation level of a plurality of aggregation levels associated with a PSCCH. Each aggregation level of the plurality of aggregation levels may be associated with a number of time-frequency resources dedicated for the PSCCH and a particular MCS used for modulating and coding control information in the PSCCH. The aggregation transmitting UE component 199 may be configured to encode control information with the MCS associated with the determined aggregation level and transmit the control information in the time-frequency resources associated with the determined aggregation level.

Generally, a UE 104, (e.g., within the representation of the car or the representation of the truck illustrated in FIG. 1) may be a UE 104 for D2D communication, such as over D2D communication link 158. The UE 104 for D2D communication may be configured to perform the determine, receive, and decode steps discussed above, as well as perform the determine, encode, and transmit steps discussed above. In other words, multiple UEs 104 (such as the UEs 104 within the car and/or the truck) may perform the determine, receive, and decode steps described as (198) as well as the corresponding determine, encode, and transmit steps described above (199). Thus, in general, UEs 104 may both transmit and receive D2D information related to a variable size control channel as well as use the variable size control channel information to transmit and receive data.

Figure 2:
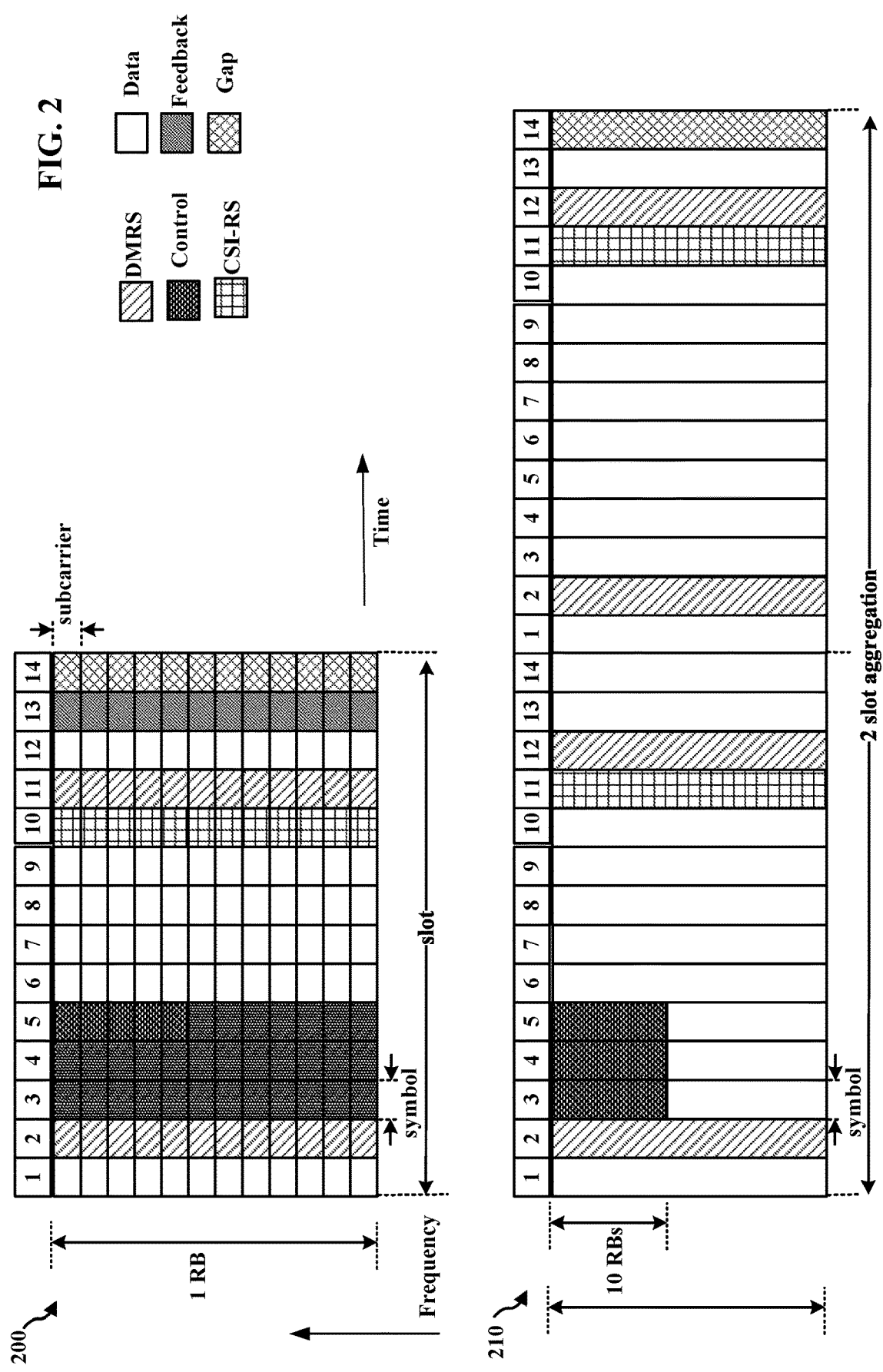
FIG. 2 illustrate example aspects of a sidelink slot structure.

FIG. 2 illustrates example diagrams 200 and 210 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slots. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
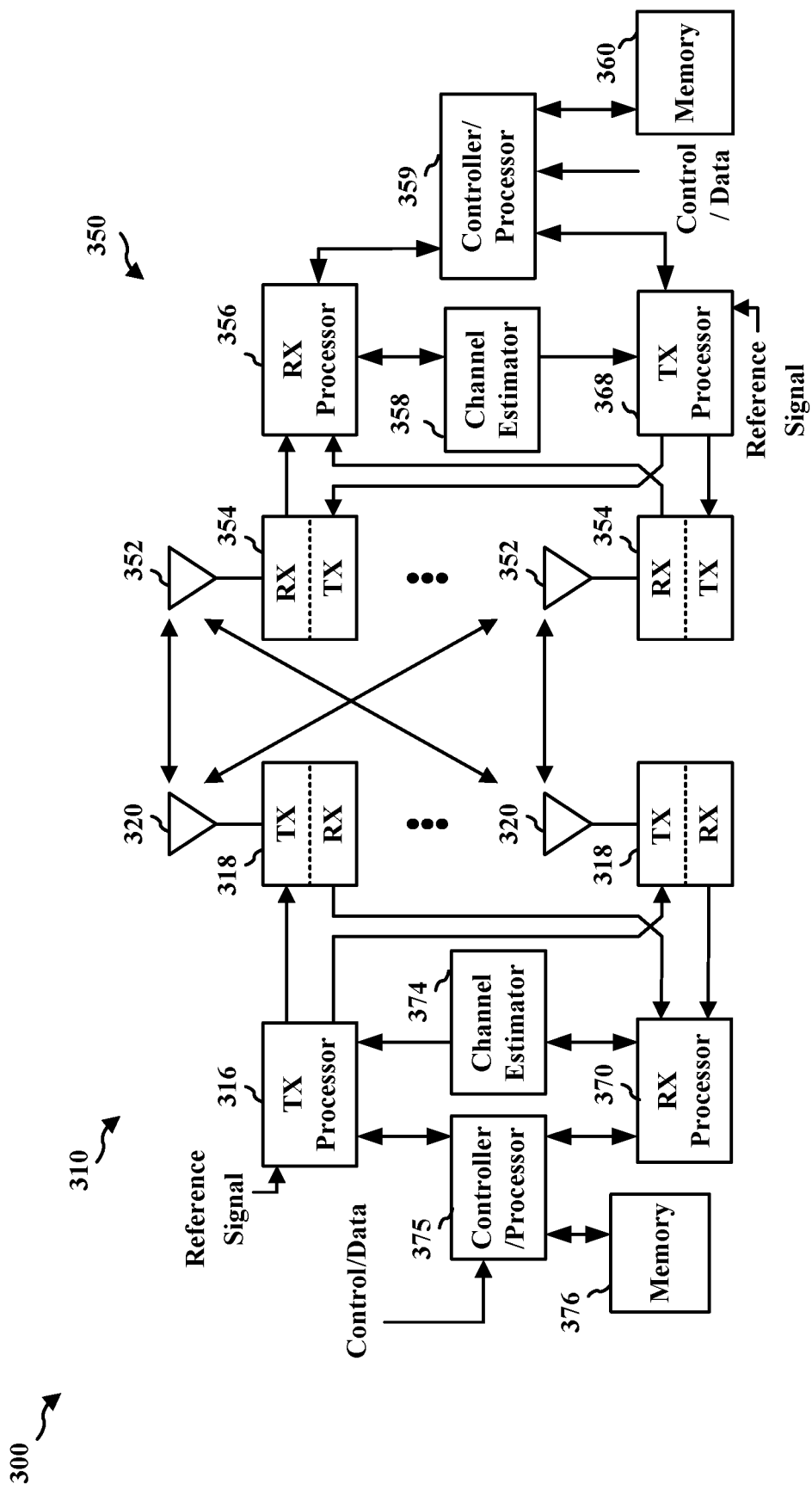
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX processor 316, the RX processor 370, or the controller/processor 375 may be configured to perform aspects described in connection with 198 and 199 of FIG. 1.

Figure 4:
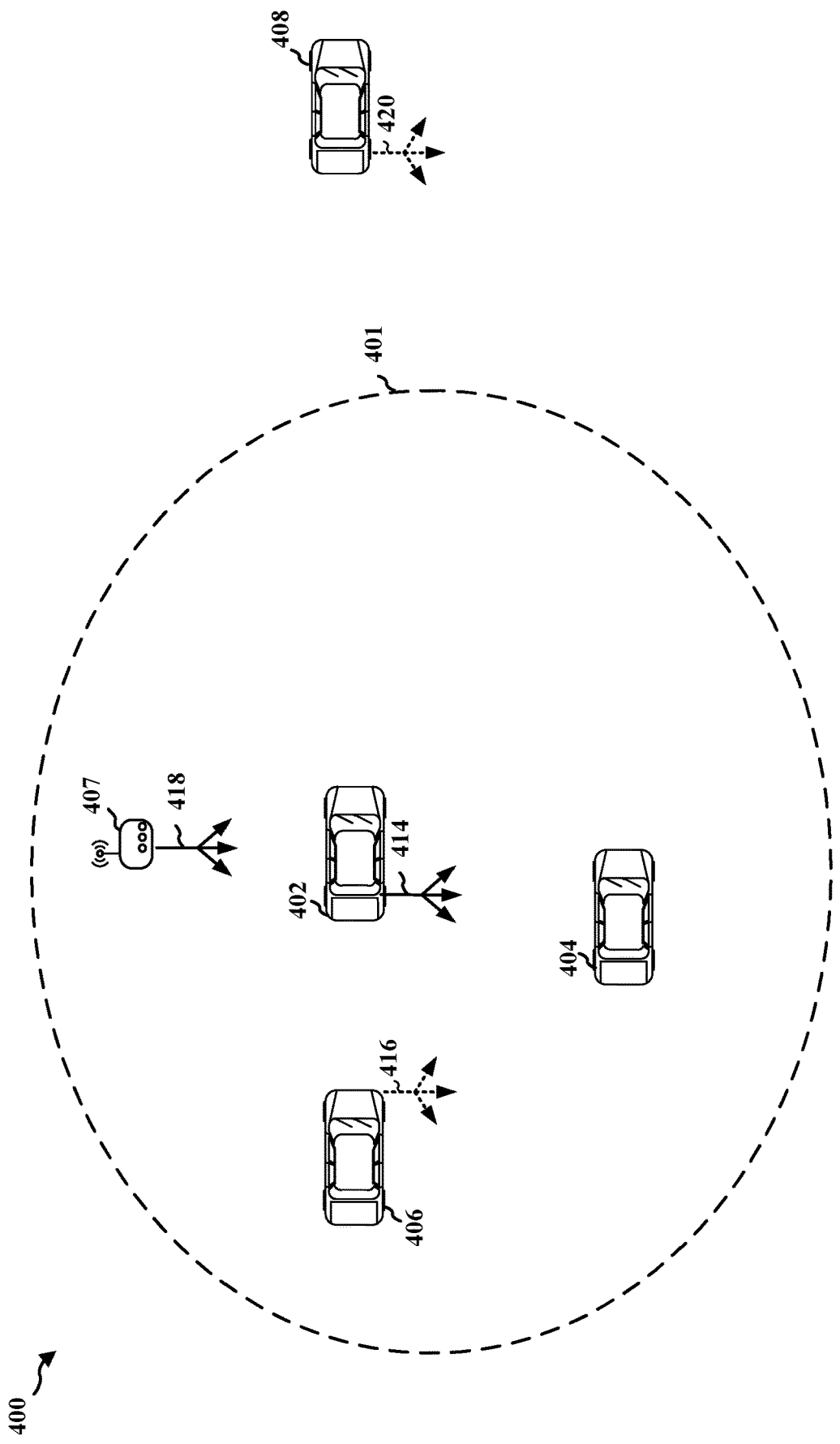
FIG. 4 is a diagram illustrating an example of wireless communication between devices based, e.g., on V2V, V2X, and/or device-to-device communication.

FIG. 4 illustrates an example 400 of wireless communication between devices based on V2X/V2V/D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 402 may transmit communications intended for receipt by other UEs within a range 401 of UE 414. Additionally/alternatively, RSU 407 may receive communication from and/or transmit communication to UEs 402, 404, 406, 408.

UE 402 may comprise an aggregation transmitting UE component, similar to 199 described in connection with FIG. 1. UEs 404, 406, 408 may each comprise an aggregation receiving UE component, similar to 198 described in connection with FIG. 1.

FIGS. 5A-5D are diagrams 500 illustrating various examples 502, 508, 514, 520 of control channel (e.g. PSCCH) and data channel (e.g. PSSCH) multiplexing over different time and frequency resources in V2X communication. In the example diagrams of FIGS. 5A-5D, the horizontal axes illustrate time and the vertical axes illustrate frequency.

Referring to FIG. 5A, in a first example 502, a PSCCH 504 and a PSSCH 506 may be multiplexed only in time. In other words, the PSCCH 504 and the PSSCH 506 may occur in the same frequency range but at different times. In one example, the PSCCH 504 may occur in time before the PSSCH 506 while using the same range of frequencies (i.e., subcarriers), as illustrated in FIG. 5A. In another example, the PSCCH 504 may occur after the PSSCH 506 within the same frequency range.

Referring to FIG. 5B, in a second example 508, a PSCCH 510 and a PSSCH 512 may be multiplexed in time like in FIG. 5A, however, the PSCCH 510 may occupy less bandwidth than the PSSCH 512. In one example, the PSCCH may span approximately half of the bandwidth used for PSSCH 512 and may occur in time before the PSSCH 512, as illustrated in FIG. 5B. In other examples, the PSCCH 510 and the PSSCH 512 may occupy other frequency ranges, with the PSCCH occurring before or after the PSSCH in time.

Referring to FIG. 5C, in a third example 514, a PSCCH 518 and a PSSCH 516 may be multiplexed only in frequency. In other words, the PSCCH 518 and the PSSCH 516 may occur at the same time, but over different frequency ranges. In one example, the PSCCH 518 may occur at a lower frequency range than, and at the same time as, the PSSCH 516. This example is illustrated in FIG. 5C. In another example, the PSCCH may occur at a higher frequency range than, and at the same time as, the PSSCH.

Referring to FIG. 5D, in a fourth example 520, a PSCCH 522 and a PSSCH 524 may be multiplexed in time and frequency such that the PSCCH 522 occurs at the same time as the PSSCH but within a different frequency span. In one example, the PSCCH may have a smaller bandwidth than the PSSCH but occupy different resources having at least one symbol overlapping in time with the PSSCH, as illustrated in FIG. 5D. In another example, the PSCCH may have a larger bandwidth than the PSSCH.

Depending on the application of data carried over a PC5 interface in V2X communications, and any requirements for fitting the data into a given set of resources, the data channel (e.g. PSSCH) may vary in the amount of data being carried as well as in the MCS used to modulate the data being carried. Thus, a UE may need to decide an MCS that the UE will need to use to achieve a certain link budget for successful V2X communication, which may depend on factors such as a certain signal range, signal quality, QoS, signal-to-interference plus noise ratio (SINR), signal-to-noise ratio (SNR), reference signal received power (RSRP), and reference signal received quality (RSRQ). Since the link budget for the control channel (e.g. PSCCH) should generally be better than that of the data channel, the UE may need to use a more robust (e.g. higher) MCS, e.g., for longer range, higher QoS, or improved SINR, SNR, RSRP, or RSRQ, for communication in the control channel. For example, the UE may need to select an MCS that can be used to transmit in PSCCH a higher number of bits per symbol than BPSK or QPSK.

However, if the control channel utilizes a fixed amount of resources and the data channel has a small MCS, the control channel may have to use a conservative (e.g. low) MCS to achieve a link budget better than that of the data channel. Since more resources would need to be allocated to accommodate the same number of bits that a higher MCS could provide in fewer resources, over-provisioning of resources for the control channel may result. While the control channel's link budget may be better in consequence, such over-provisioning may unnecessarily increase the number of resources a UE would have to decode to obtain the data, reducing the likelihood of successful decoding and limiting the usefulness of the access link budget.

Accordingly, the present disclosure provides a variable size control channel in V2X communication. The control channel may be PSCCH. In some cases, a less robust transmission (e.g. a smaller link budget) may be required for the control channel. For example, the range between a transmitting UE and a receiving UE may be short, or a 5G QoS Identifier (5QI) requirement from an upper layer of the transmitting UE may indicate a priority level or other value requiring less link budget. In these cases, the variable size control channel may be configured at minimum as spanning only one basic unit (i.e. one subchannel in frequency and one symbol in time). However, in other cases a more robust transmission (e.g. a larger link budget) may be required for the control channel. For example, the range between the transmitting and receiving UE may be long, or the 5QI requirement received from the upper layer of the transmitting UE may indicate a priority level or other value requiring more link budget. In such cases, the basic unit may be aggregated in time and frequency to span additional symbols and/or subchannels in the variable-size control channel. By allowing for these additional resources (e.g. different aggregation levels) to be variably configured based on the link budget, the present disclosure allows the robustness of the control channel to increase when a larger link budget is required and to decrease when a smaller link budget is sufficient. Since the MCS can be configured accordingly (lower or higher) due to the different aggregation levels in the variable control channel, over-provisioning of resources in a fixed control channel may be eliminated and improved decoding of data may result.

As indicated above, an MCS may map to a certain aggregation level. For example, a transmitting UE may determine an aggregation level to use for the control channel based on an MCS selected to achieve V2X communication, e.g., based on a predetermined range, signal quality, QoS, SINR, SNR, RSRP, RSRQ, etc. Moreover, an aggregation level may map to a certain configuration of time-frequency resources in the control channel. For example, FIGS. 6-11 illustrate various configurations of time-frequency resources that may be used for various aggregation levels. The configurations may be based on the mapping of the aggregation level to the selected MCS. Each aggregation level of the plurality of aggregation levels may be associated with a different number of time-frequency resources dedicated for the PSCCH.

Figure 6:
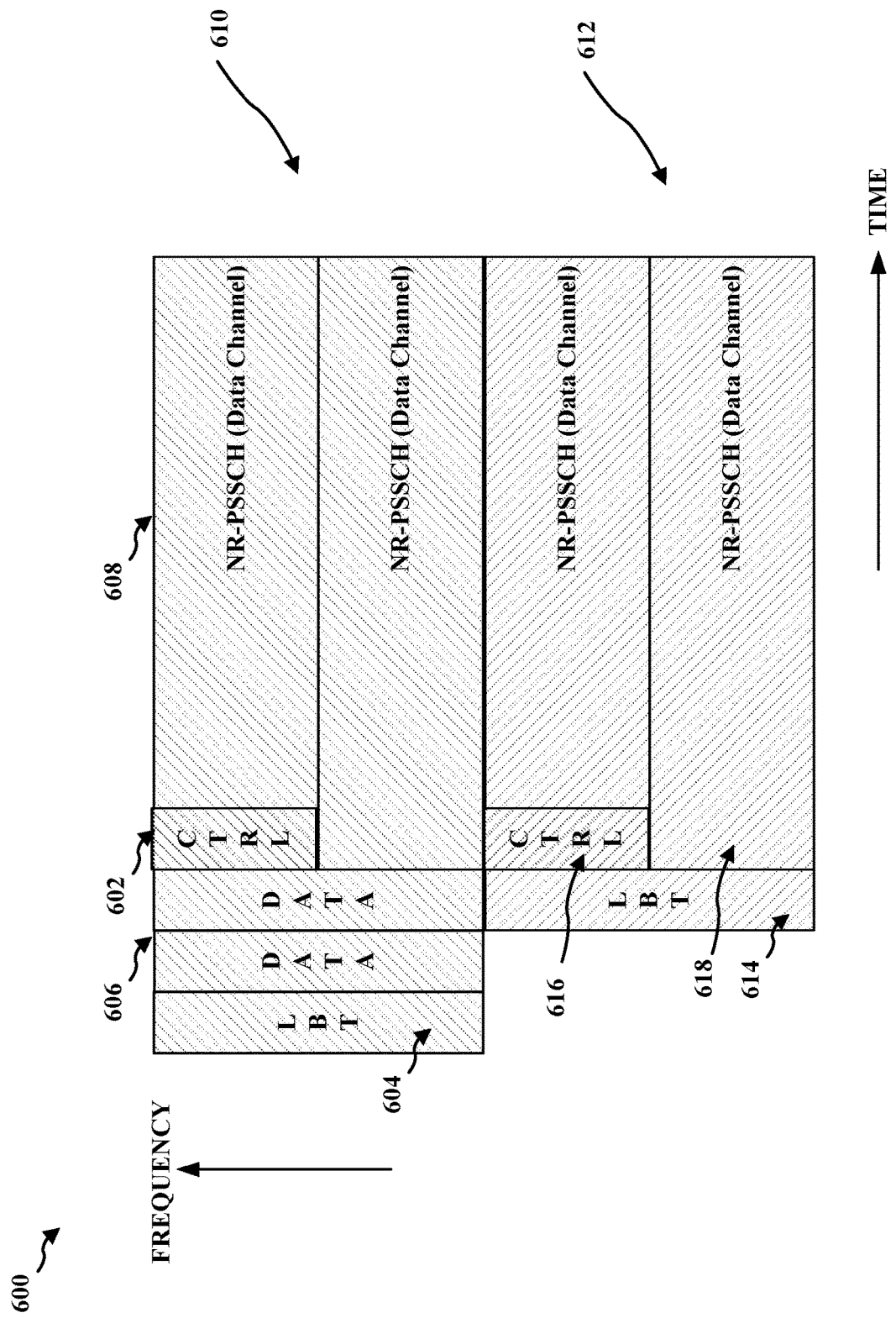
FIG. 6 is a diagram illustrating an example of time-frequency resource usage for control channel transmissions and data channel transmissions.

FIG. 6 is a diagram illustrating an example 600 of time-frequency resource usage for control channel transmissions and data channel transmissions in two different V2X communications 610, 612. That is, V2X communication 610 may occur between two UEs, while V2X communication 612 may occur between two same and/or different UEs on a different frequency than V2X communication 610. The example 600 illustrates one possible placement of control information 602, 616 (e.g. in PSCCH) among various other transmissions in V2X communications 610, 612. For example, FIG. 6 illustrates that in V2X communication 610, a transmitting UE first performs a listen-before-talk (LBT) sequence 604 (e.g. performs clear channel assessment (CCA)) to reserve a channel for communication with a receiving UE, and then afterwards sends data 606 (e.g. each block spanning multiple subcarriers and one symbol each in PSSCH), control information 602 (e.g. spanning one subcarrier and one symbol in PSCCH), and data 608 (e.g. each block spanning one subcarrier and multiple symbols each in PSSCH). Similarly, FIG. 6 illustrates that in V2X communication 612, a transmitting UE performs a LBT sequence 614 (e.g. CCA) to reserve another channel for communication with a receiving UE, and then afterwards sends the control information 616 (e.g. spanning one subcarrier and one symbol in PSCCH), and data 618 (e.g. each block spanning one subcarrier and multiple symbols each in PSSCH). The transmitting UEs and/or receiving UEs may be the same or different. In the example diagram of FIG. 6, the horizontal axis illustrates time and the vertical axis illustrates frequency.

In either communication 610, 612, a high MCS may be used for modulating the control information 602, 616. For example, the required link budget for either communication may be small, and so only a single control block for control information 602, 616 may respectively be used. As a result, the configuration illustrated in FIG. 6 may allow for a high MCS (for example, 64-QAM) to be used for PSCCH. However, different numbers of blocks for the control information may be used based on the link budget or robustness required for a particular pair of UEs.

As the communications between the pairs of UEs in the example of FIG. 6 both use a single control block 602, 616, each set of UE pairs may have a similar required link budget or robustness. For example, V2X communication 610 may occur between one pair of UEs located near each other, while V2X communication 612 may occur between another pair of UEs located near each other (e.g. with relatively small range). Accordingly, similar link budgets may be required to carry out the communications. Alternatively, the UEs may be diversely located but may have similar link budgets based on similar 5QI requirements. It will be understood that the number of blocks used for control information may vary between pairs of UEs in D2D communication.

In an aspect, systems and methods implementing variable size PSCCH (control) and aggregation may allow for variable size control channels. The PSCCH may occupy a variable amount of time-frequency resources. For example, FIG. 6 illustrates two D2D UE communications 610, 612 that each use a single block for the control information. In an example, a PSCCH (control) may use one subchannel in frequency and one symbol in time as a basic unit, e.g., a block, resource element. Accordingly, each of the blocks illustrated in FIG. 6 may be one subchannel in frequency and one symbol in time. One subchannel in frequency and one symbol in time may be used when a larger link budget is not required. As larger link budgets or robustness are required, additional blocks for control information (e.g. aggregation levels) may be added in time and/or frequency. Thus, additional time-frequency resources may be used.

As discussed above, when a larger link budget is required, the basic control unit of one subchannel in frequency and one symbol in time may be aggregated in time, aggregated in frequency, or aggregated in both time and frequency so that additional time-frequency resources are used. For example, FIGS. 7-11 illustrate different numbers of blocks used for control. Using a greater number of blocks for control, i.e., more symbols, more subchannels, or more symbols and subchannels may improve the link budget and/or increase the robustness of the control channel. A greater number of blocks may be used when a larger link budget is required. For example, a processor in a transmitting UE may determine to use control aggregation based on a link budget range communicated from upper layers, such as a network layer (layer 3) or higher in the seven layer Open System Interconnection (OSI) model. A greater number of blocks may also be used when a QoS indicator is provided by upper layers, such as a network layer (layer 3) or higher. For example, the QoS indicator may be a 5QI requirement from upper layers in a 5G communication system. The link budget or 5QI requirement may indicate that a more robust transmission is required or that a higher link budget is required to provide a larger range so that signals may be received over a greater distance between devices. A larger link budget may also be required to overcome obstacles in the signal path between two UEs in D2D communications.

Figure 7:
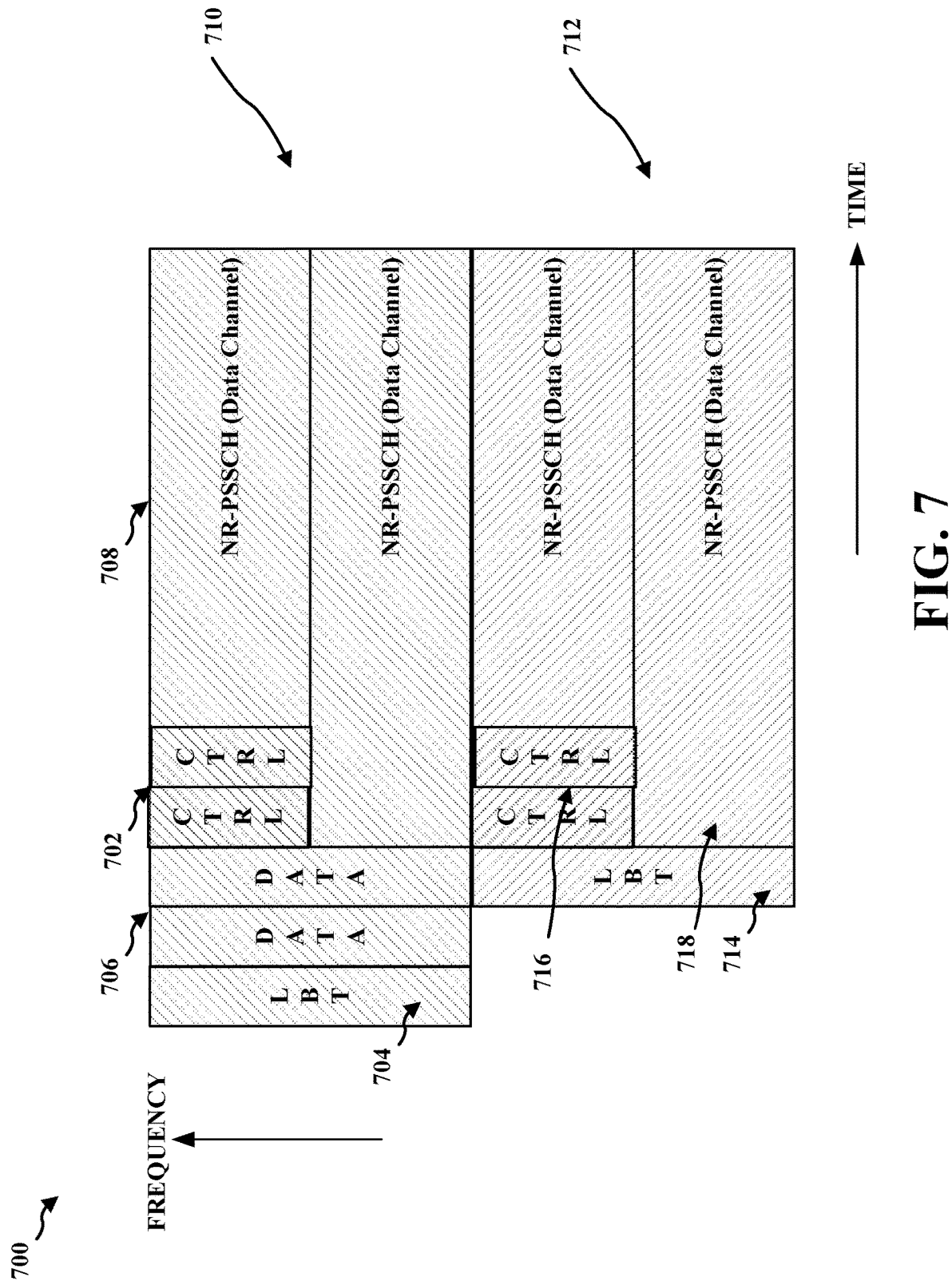
FIG. 7 is another diagram illustrating an example of time-frequency resource usage for control channel transmissions and data channel transmissions.

FIG. 7 is a diagram illustrating another example 700 of time-frequency resource usage for control channel transmissions and data channel transmissions in two different V2X communications 710, 712 where a larger link budget may be required. The example 700 of FIG. 7 is substantially identical to that of example 600 of FIG. 6, except that the control information in PSCCH is aggregated in time by an additional block for both V2X communications 710, 712. Thus, FIG. 7 illustrates two blocks of control information 702, 716 sent by a transmitting UE in PSCCH for both V2X communications 710, 712. The example 700 illustrates one possible set of transmissions of control information 702, 716 among various other transmissions, including the performing of listen-before-talk (LBT) sequences 704, 714 (e.g. CCAs) and the sending of data 706, 708, 718 (e.g. on PSSCH).

Accordingly, because two blocks of control information 702, 716 are used for each communication, the configuration of FIG. 7 may have a lower MCS as compared to the MCS in the example of FIG. 6, since additional control resources are available for modulating bits of the control information. Thus, as the aggregation level increases, the MCS may be decreased while maintaining larger link budget requirements. It will be understood, however, that different numbers of blocks may be used based on the link budget or robustness required for a particular pair of UEs, e.g., such as the single control blocks 602, 616 illustrated in FIG. 6. Moreover, in this example, since the communications 710, 712 between the pairs of UEs in the example of FIG. 7 both use two blocks of control information 702, 716, each set of pairs of UEs may be assumed to have a similar link budget or robustness requirement, as was discussed with respect to FIG. 6. In other examples, the number of blocks of control information for communication between UEs may differ.

As discussed above, in an aspect, systems and methods implementing variable size PSCCH (control channel) and aggregation may allow for variable size control channels. The PSCCH may occupy a variable amount of time-frequency resources. For example, FIG. 7 illustrates two D2D UE communications (e.g. V2X communications 710, 712) that each use two blocks for control information 702, 716. In an example, a PSCCH (control) may use one subchannel in frequency and one symbol in time as a basic unit, e.g., a block. Accordingly, each of the blocks illustrated in FIG. 7 may be one subchannel in frequency and one symbol in time (e.g. control information 702 and 716 may each span two symbols in one subchannel). As described with respect to FIG. 6, one subchannel in frequency and one symbol in time may be used when a larger link budget is not required. As illustrated in FIG. 7, however, when larger link budgets or more robustness are required, additional blocks for control information may be used. Thus, FIG. 7 illustrates the use of two blocks for control information in V2X communications.

Figure 8:
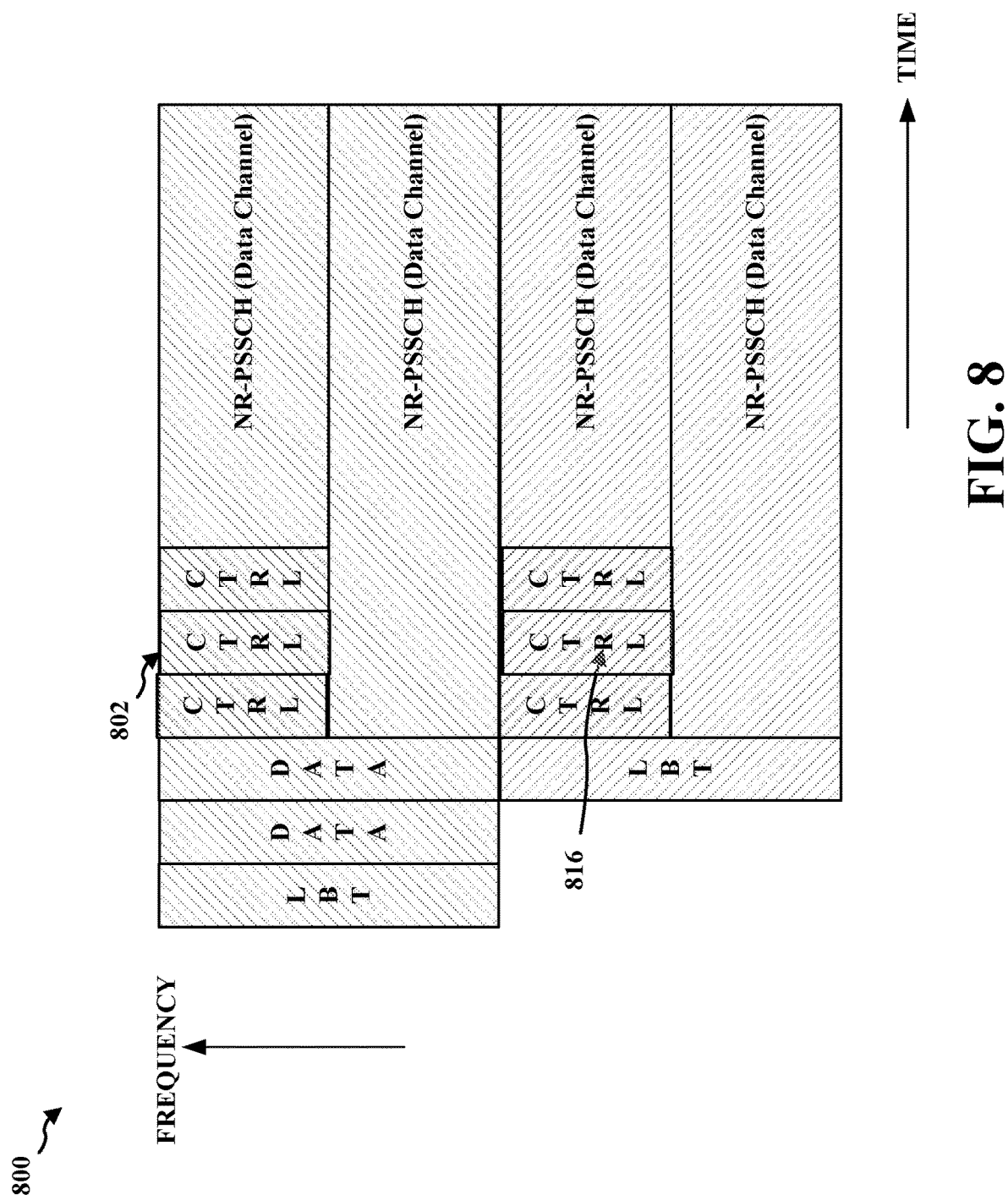
FIG. 8 is another diagram illustrating an example of time-frequency resource usage for control channel transmissions and data channel transmissions.

FIG. 8 is a diagram illustrating another example 800 of time-frequency resource usage for control channel transmissions and data channel transmissions in multiple V2X communications. The example of FIG. 8 may have larger link budget requirements, and thus may be configured to have a higher aggregation level, than the examples of FIGS. 6 and 7. Thus, while FIG. 6 illustrated single control blocks 602, 616 used for control channel transmissions and FIG. 7 illustrated two sets of two control blocks 702, 716 used for control channel transmissions, FIG. 8 illustrates three blocks of control information 802, 816 used for control channel transmissions as an example. Thus, control information 802 may span three symbols in one subchannel, and control information 816 may span three symbols in a different subchannel. Accordingly, because three control blocks 802, 816 are used, the configuration of FIG. 8 may have a lower MCS as compared to the MCS in the examples of both FIGS. 6 and 7. Accordingly, the configuration of FIG. 8 may be used for cases when a more robust MCS is desired.

Figure 9:
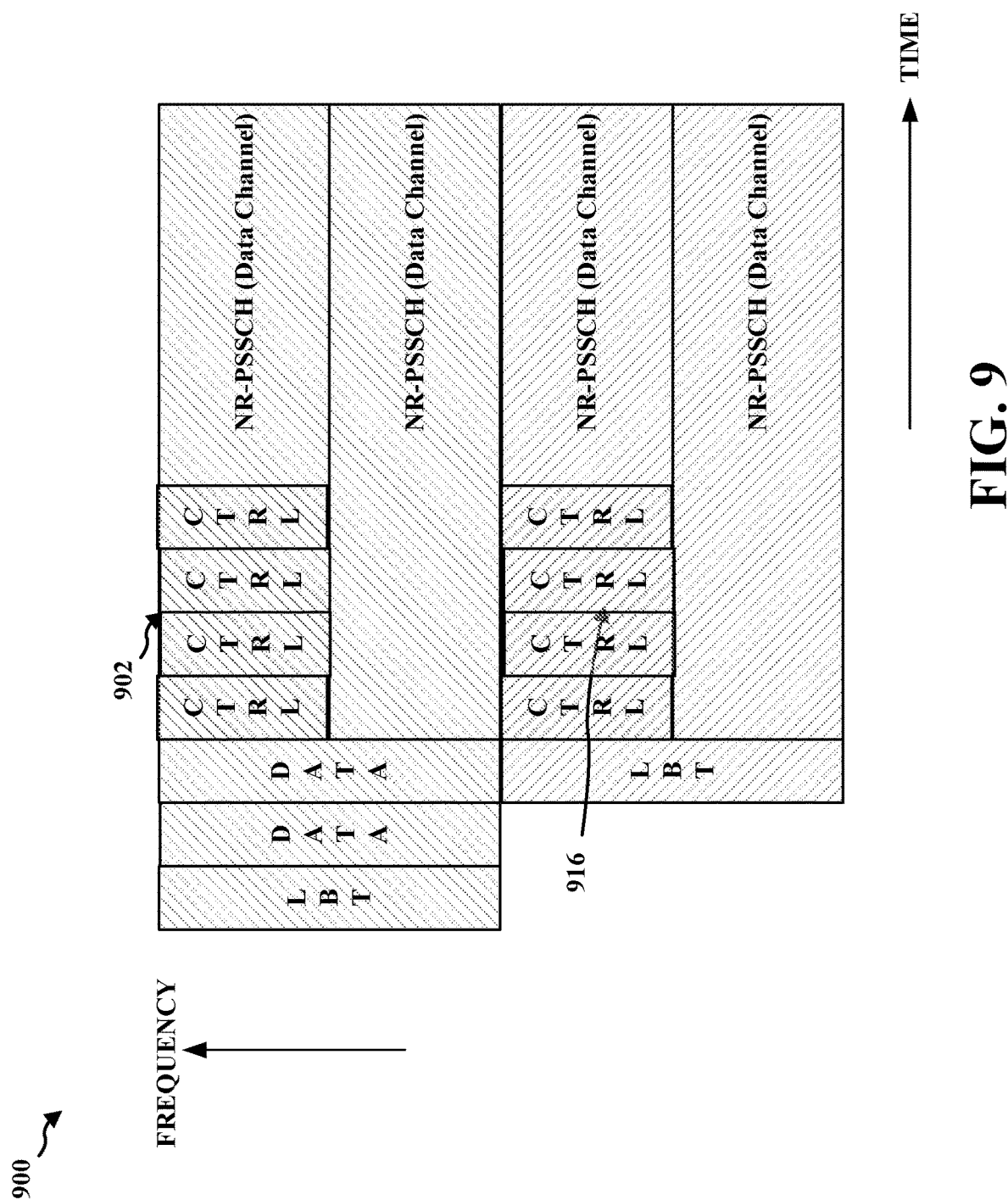
FIG. 9 is another diagram illustrating an example of time-frequency resource usage for control channel transmissions and data channel transmissions.

FIG. 9 is diagram illustrating another example 900 of time-frequency resource usage for control channel transmissions and data channel transmissions in multiple V2X communications. The example of FIG. 9 may have larger link budget requirements, and thus may be configured to have a higher aggregation level, than the examples of FIGS. 6, 7, and 8. For example, FIG. 9 illustrates four blocks 902, 916 used for control channel transmissions (e.g. spanning four symbols and one subchannel each in both V2X communications). Accordingly, because four blocks of control information 902, 916 are used, the configuration of FIG. 9 may have a lower MCS as compared to the MCS in the examples of each of FIGS. 6, 7, and 8. Accordingly, the configuration of FIG. 9 may be used for cases when an even more robust MCS than that of FIG. 8 is desired.

Figure 10:
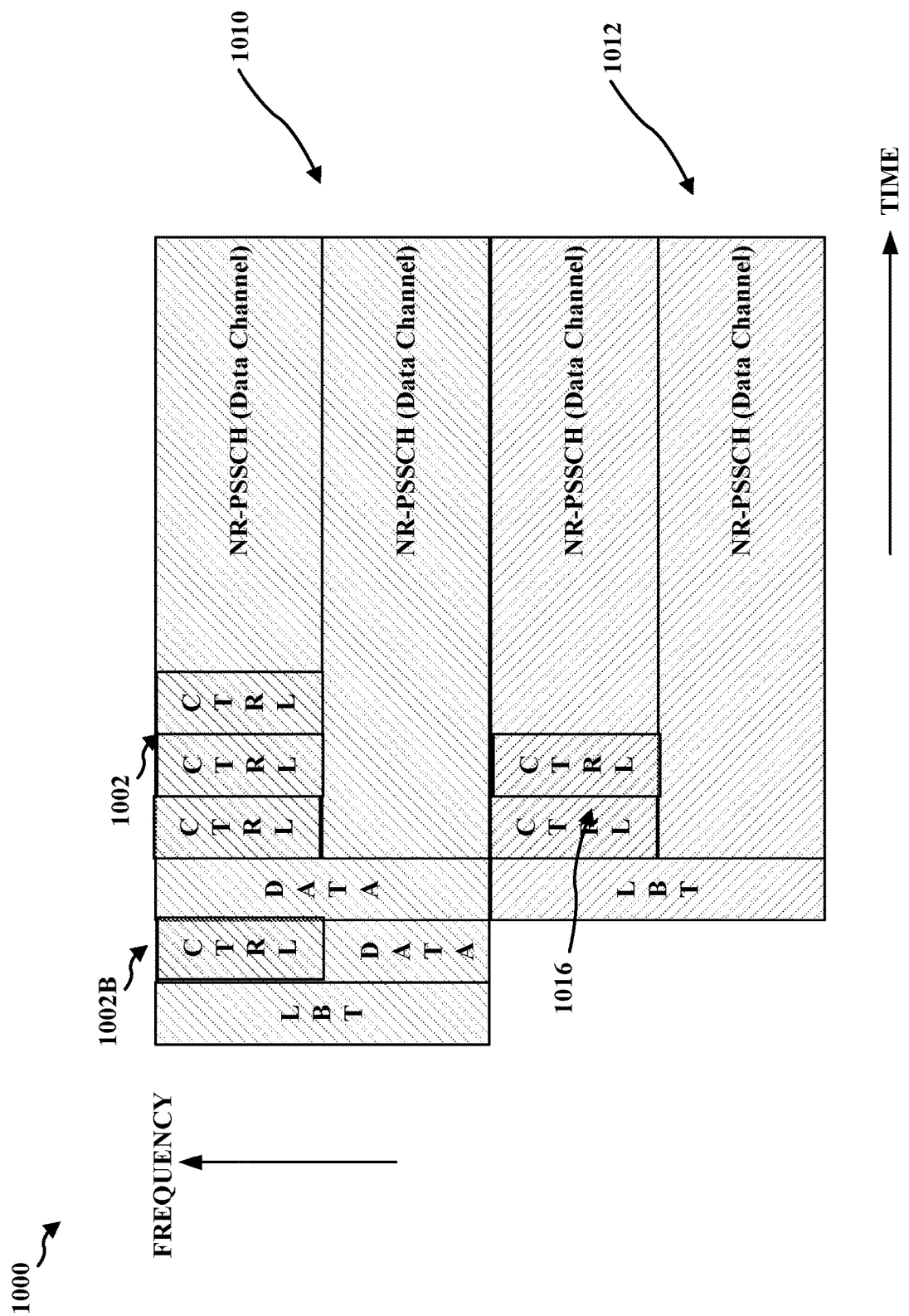
FIG. 10 is another diagram illustrating an example of time-frequency resource usage for control channel transmissions and data channel transmissions.

FIG. 10 is diagram illustrating another example 1000 of time-frequency resource usage for control channel transmissions and data channel transmissions in multiple V2X communications. FIG. 10 illustrates an example 1000 where a communication 1010 between a first pair of UEs and a communication 1012 between a second pair of UEs do not require the same number of blocks of control information (e.g. they have different aggregation levels). As in FIGS. 6-9, the transmitting UE in the first pair of UEs may be the same as or different than the transmitting UE in the second pair of UEs, and the receiving UE in the first pair of UEs may be the same as or different than the receiving UE in the second pair of UEs. In the example of FIG. 10, the communication 1010 between one pair of UEs may use four blocks for control information 1002 (e.g. four symbols in one subchannel), while the communication 1012 between another pair of UEs may use two blocks for control information 916 (e.g. two symbols in one subchannel). Additionally, in an aspect, at least one of the blocks of control information (e.g. 1002B) in one or more of the communications 1010, 1012 may be separated by data from the other blocks of control information 1002 (see, for example, communication 1010 in FIG. 10). Accordingly, the configurations of the two example communications 1010, 1012 in FIG. 10 may have different MCS values. For instance, the MCS for the communication 1010 is lower than the MCS for the communication 1012. However, it will be understood that different numbers of blocks for control information may be used based on the link budget or robustness required for a particular pair of UEs.

As discussed above, when a larger link budget is required, the basic control unit of one subchannel in frequency and one symbol in time may be aggregated in time, aggregated in frequency, or aggregated in both time and frequency so that additional time-frequency resources are used. Using a greater number of blocks for control, i.e., more symbols, more subchannels, or more symbols and subchannels may improve the link budget and/or increase the robustness of the control channel. A greater number of blocks may be used when a larger link budget is required. The link budgets between pairs of UEs communicating in D2D communications may vary. Accordingly, the number of blocks used for control communications may vary. For example, in FIG. 10, communication 1010 may have a larger required link budget, and therefore its PSCCH may be configured to have a higher aggregation level, than in communication 1012.

Figure 11:
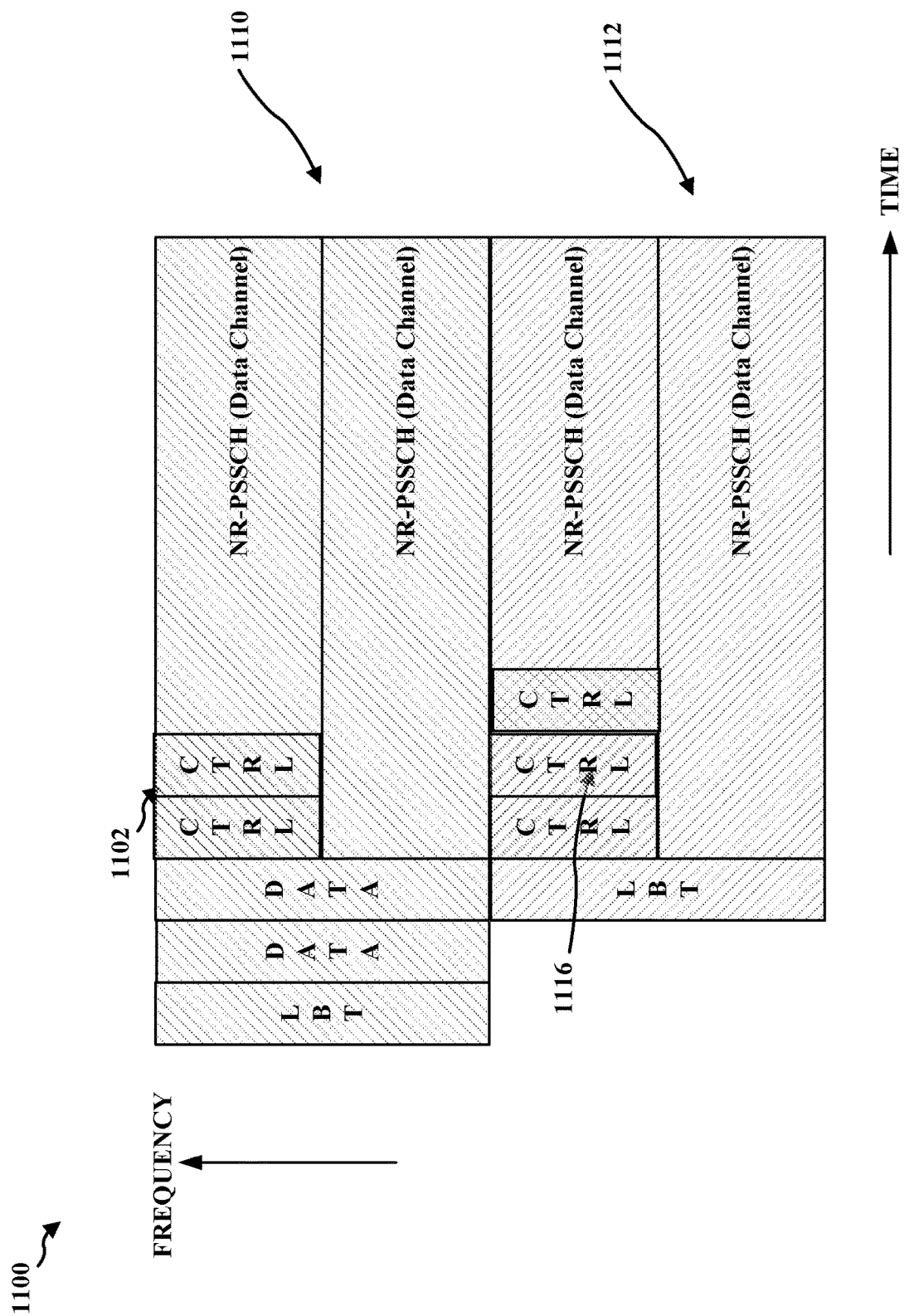
FIG. 11 is another diagram illustrating an example of time-frequency resource usage for control channel transmissions and data channel transmissions.

FIG. 11 is diagram illustrating another example 1100 of time-frequency resource usage for control channel transmissions and data channel transmissions in multiple V2X communications 1110, 1112. Like the example of FIG. 10, the example 1100 illustrates that a communication 1110 between a first pair of UEs and a communication 1112 between a second pair of UEs may not require the same number of blocks of control information. For example, as illustrated in FIG. 11, communication 1110 between a pair of UEs may use two blocks for control information 1102, while communication 1112 between another pair of UEs may use three blocks for control information 1116. Thus, communication 1110 may have a lower link budget than communication 1112. Accordingly, the configurations of the two examples in FIG. 11 may have different MCS values (e.g. the MCS for the communication 1110 may be higher than the MCS for the communication 1112). However, it will be understood that different numbers of blocks for control information may be used based on the link budget or robustness required for a particular pair of UEs.

Figure 12:
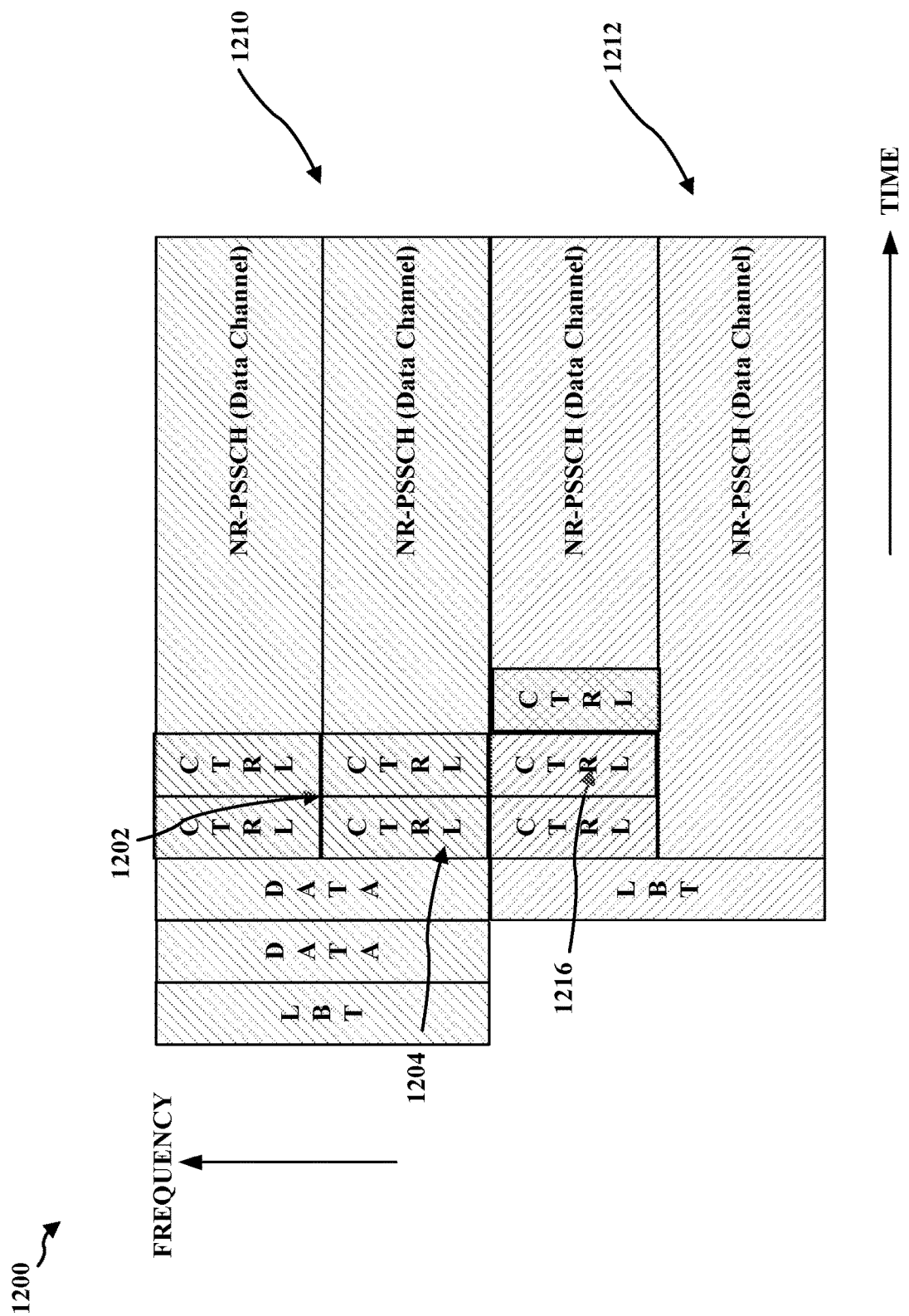
FIG. 12 is another diagram illustrating an example of time-frequency resource usage for control channel transmissions and data channel transmissions.

FIG. 12 is diagram illustrating another example 1200 of time-frequency resource usage for control channel transmissions and data channel transmissions in multiple V2X communications. Like FIGS. 10 and 11, the example 1200 illustrates that a communication 1210 between a first pair of UEs and communication 1212 between a second pair of UEs may not require the same number of control blocks. However, in this example, the blocks of control information may be multiplexed in frequency (e.g. spanning different frequency ranges), as well as in time. For example, as illustrated in FIG. 12, communication 1210 between a pair of UEs may use four blocks of control information 1202 (e.g. two symbols across two subchannels) while communication 1212 between another pair of UEs may use three blocks for control information 1216 (e.g. three symbols across one subchannel). Thus, communication 1210 may have a higher link budget than communication 1212. Accordingly, the configurations of the two examples in FIG. 12 may have different MCS values (e.g. the MCS for the communication 1210 may be lower than the MCS for the communication 1212). Different numbers of blocks of control information may be used based on the link budget or robustness required for a particular pair of UEs.

In some aspects, some of the symbols that may potentially be used for control information may be vulnerable to SINR variation. For example, referring to FIG. 12, certain symbols 1204 in which control information may be transmitted (e.g. in V2X communication 1210) may be adjacent to other resource blocks which another UE might use for its own transmission of control information (e.g. in V2X communication 1212). Thus, symbols 1204 may in some cases be vulnerable to SINR variation caused by interference from other communications. Accordingly, control channel transmission may be configured to occur on symbols which are not vulnerable to SINR, e.g., on symbols that are not near in time and/or frequency to resource blocks used by other UEs, for example, as illustrated in FIGS. 6-11. Control information may thus be spread in time and/or frequency across symbols less vulnerable or invulnerable to SINR variations to increase link budget and/or robustness. The transmission of the control information may occur with different aggregation levels to occupy more frequency resources (e.g., subchannels), more time resources (e.g., symbols), or both more frequency resources and more time resources.

In a variable size control channel, a transmitting UE may configure a certain aggregation level and send control information using various time-frequency resources. Thus, when control channel aggregation is used, the receiving UE may need to identify the size of the control channel or the level of control channel aggregation to successfully decode the control information, and ultimately, the data received by the UE, e.g., in a D2D communication. The following example mechanisms or methods may be used to identify the size of the variable size control channel or the control channel aggregation level.

In a first mechanism, a receiving UE may perform blind decoding to determine the possible control channel size or the control channel aggregation level. For example, with blind decoding, a receiving UE may assume different control channel aggregation levels and attempt to decode received transmissions using the assumed control channel aggregation levels. A cyclic redundancy check (CRC) of decoded bits from the received PSCCH transmission may indicate a correct reception of bits when an assumed control channel aggregation level is correct. When an assumed control channel aggregation level is incorrect, the UE may assume a different control channel aggregation level and repeat blind decoding based on the new aggregation level until the control channel information is successfully decoded. Thus, the UE may determine the aggregation level from the blind decoding by checking the decoded bits CRC to verify that the assumed control channel aggregation level is correct, or if incorrect, repeating the process with a new assumed control channel aggregation level when necessary until a correct assumption is determined.

As an example, referring to FIG. 7, a transmitting UE may configure its aggregation level such that two blocks of control information 702 are transmitted to the receiving UE in communication 710. The control information may include SCI. The transmitting UE may configure a CRC for the SCI based on a PSCCH scrambling identity. When the receiving UE receives the communication 710, the receiving UE may blindly decode the aggregation level by assuming different aggregation levels. For instance, the receiving UE may first assume the aggregation level is as illustrated in FIG. 6 (e.g. aggregation level 1 or another number), and attempt to decode the SCI accordingly by, for example, demasking the CRC and comparing an expected value to the scrambling identity. If the decoding is unsuccessful, the receiving UE may assume a higher aggregation level as illustrated in FIG. 7 (e.g. aggregation level 2 or another number), and again attempt to decode the SCI accordingly. The process repeats until decoding is successful. In this example referencing FIG. 7, decoding will be successful at the second aggregation level, and the UE may thus determine the control channel aggregation level is 2.

In an aspect, there may be a maximum control channel size or control channel aggregation level which is predefined. Defining a maximum control channel size may limit the number of different control channel sizes available for the UE to attempt blind decoding, e.g., one to a number, n. Thus, the number of assumed aggregation levels that the receiving UE may check when attempting to blindly decode the control information may be limited to the maximum of n.

In a second mechanism, an LBT sequence may be used to identify the size of the variable size control channel or the control channel aggregation level. The LBT sequence may be performed before the transmission of the control channel, for example, as illustrated by LBT sequences 604 and 704. The transmitting UE may configure its LBT sequence to indicate the control channel size or the control channel aggregation level. A receiving UE may receive the LBT sequence before receiving the control information over configured time-frequency resources, and determine the aggregation level from the LBT sequence. For example, when the transmitting UE transmits a signal in the process of performing LBT, the signal may include information indicating the control channel aggregation level (e.g. using a bit or some other information). A receiving UE may acquire this signal and determine the aggregation level from the information. Thus, based on the LBT sequence indicating the control channel size or the control channel aggregation level, a UE may decode the control channel information and ultimately use that control channel information to decode data transmissions.

In a third mechanism, a demodulation reference signal (DMRS) (e.g., see FIG. 2) may be used in a control channel to indicate the size of the variable size control channel or the control channel aggregation level. For example, different cyclic shifts may be used for DMRS of control for different aggregation levels. For example, a transmitting UE may configure DMRS to have different amounts of cyclic shifts depending on the aggregation level (e.g. the cyclic shift may be different for each example in FIG. 6, FIG. 7, etc.), and a receiving UE may receive the DMRS and determine the aggregation level based on the cyclic shift(s). Thus, the size of the variable size control channel or the control channel aggregation level may be determined based on a cyclic shift of the received DMRS.

In a fourth mechanism, a resource pool configuration may provide an indication of the size of the variable size control channel or the control channel aggregation level. For example, the transmitting UE may send a resource pool configuration (for instance, a PSCCH resource block pool) which includes information indicating the level of control channel aggregation being used (e.g. using a bit or otherwise). The information may be different depending on the aggregation level. The receiving UE may receive the resource pool configuration and determine the size of the variable size control channel or the control channel aggregation level based on the resource pool configuration. The resource pool configuration may include particular time-frequency resources for one resource pool of a plurality of resource pools, where each resource pool is associated with an aggregation level. For example, the location in time (e.g., symbols, mini-slots, slots, subframes, or frames) and/or frequency of a block of control information (e.g., a set of subcarriers or set of RBs within system bandwidth) may indicate the size of the variable size control channel or the control channel aggregation level.

Figure 13:
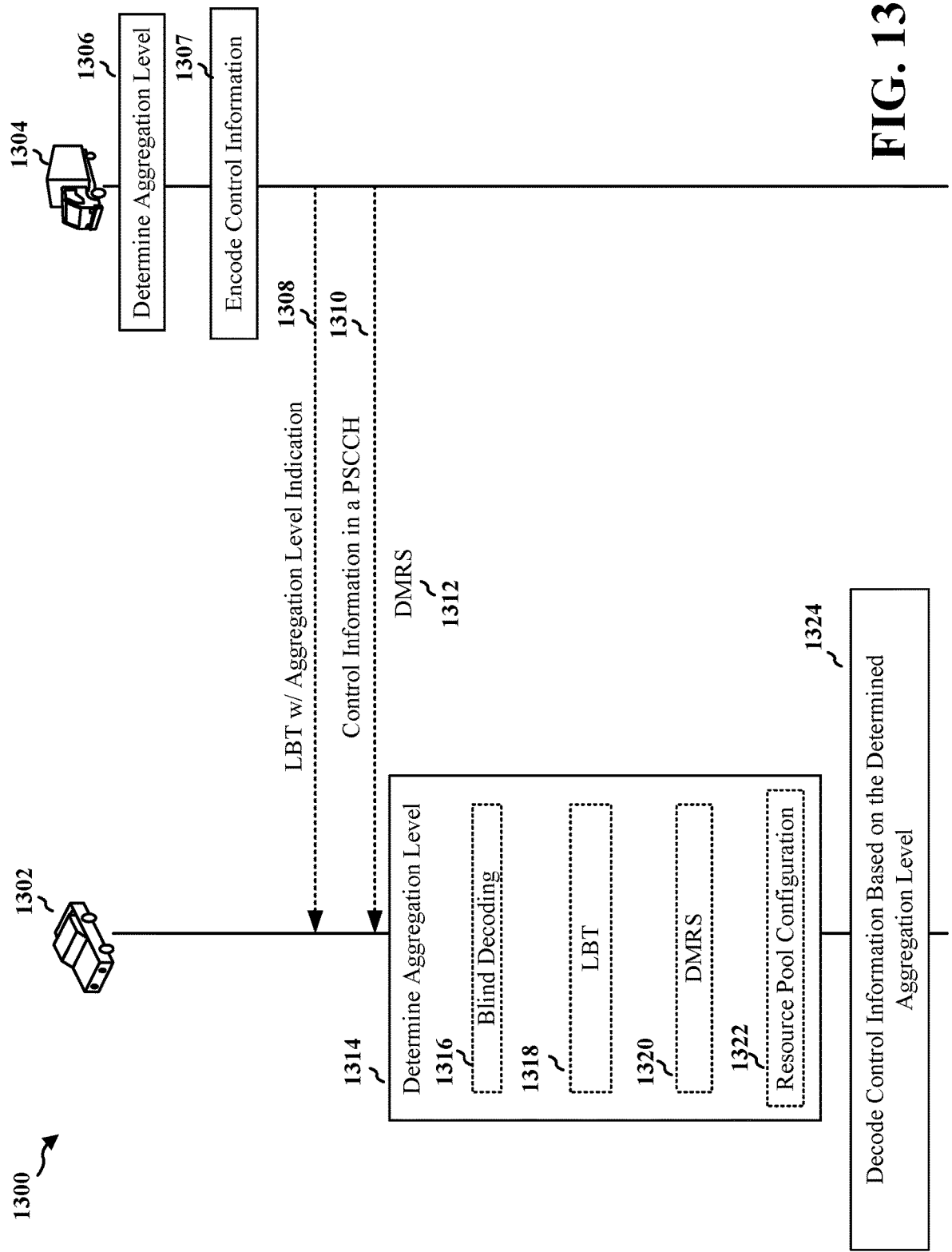
FIG. 13 is a call flow diagram illustrating a device-to-device communications system.

FIG. 13 illustrates an example communication flow 1300 between a receiving device 1302 and a transmitting device 1304. The communication may be based on V2X, V2V, or D2D based communication directly from a transmitting device to a receiving device. The communication transmitting from device 1304 may be broadcast and received by multiple receiving devices within range of a particular transmitting device, as described in connection with FIG. 4. The transmitting device 1304 may correspond to the transmitting UE described in connection with FIGS. 6-12. Moreover, the receiving UE 1302 may correspond to the receiving UE described in connection with FIGS. 6-12.

The transmitting device 1304 may determine an aggregation level (1306). For example, the transmitting device 1304 may determine an aggregation level (1306) for control information, e.g., an aggregation level associated with a PSCCH. For example, the transmitting device 1304 may decide an MCS that the transmitting device will need to use to achieve a required link budget. The MCS will map to a certain aggregation level. The transmitting device 1304 may determine the aggregation level to use based on the selected MCS to achieve V2X communication, e.g., based on a predetermined range, signal quality, QoS, SINR, SNR, RSRP, RSRQ, etc. The aggregation level may be an aggregation level of a plurality of aggregation levels associated with a PSCCH. The aggregation level associated with the PSCCH may indicate an aggregation of control information in time, an aggregation of control information in frequency, or an aggregation of control information in both time and frequency. An aggregation level will map to a certain configuration of time-frequency resources in the control channel. For example, the transmitting device 1304 may determine an aggregation level as illustrated in any of FIGS. 6-12.

Each aggregation level of the plurality of aggregation levels may be associated with time-frequency resources dedicated for control information, e.g., the PSCCH. For example, each aggregation level of the plurality of aggregation levels may be associated with a different number of time-frequency resources dedicated for the PSCCH used for transmission of the PSCCH. For example, a first aggregation level may indicate that a single block of time-frequency resources is used (e.g. as illustrated in FIG. 6), while a second aggregation level may indicate that two blocks of time-frequency resources are used (e.g. as illustrated in FIG. 7). Similarly, a third aggregation level may indicate that three blocks of time-frequency resources are used (e.g. as illustrated in FIG. 8), while a fourth aggregation level may indicate that four blocks of time-frequency resources are used (e.g. as illustrated in FIG. 9). Thus, different aggregation levels may be used to indicate different numbers of time-frequency blocks used. The transmitting device 1304 may determine an aggregation level based on a number of time-frequency resources for control information configured to be used.

The transmitting device 1304 may encode control information (1307) with the MCS associated with the determined aggregation level (1306). For example, a particular aggregation level may map to a particular MCS. The MCS may be a particular digital modulation scheme such as phase-shift keying (PSK), frequency-shift keying (FSK), amplitude-shift keying (ASK), quadrature amplitude modulation (QAM), or another digital modulation schemes. Furthermore, a particular aggregation level may indicate a particular variation of PSK, FSK, ASK, QAM, or other digital modulation. For example, if a particular aggregation level indicates PSK, the aggregation level may, more specifically, indicate binary phase-shift keying (BPSK), quadrature phase-shift keying (QPSK), or some other form of PSK.

For instance, in one example, the transmitting device 1304 may determine that 64-QAM is associated with the aggregation level 1 (illustrated for example in FIG. 6), and therefore may encode the control information (e.g. SCI) in PSCCH based on 64-QAM. Alternatively, the UE may determine that 16-QAM is associated with the aggregation level 2 (illustrated for example in FIG. 7), and therefore may encode the control information (e.g. SCI) in PSCCH based on 16-QAM. The above MCS are merely examples; other MCS may be mapped to various aggregation levels.

After encoding the control information based on the MCS and aggregation level, the transmitting device 1304 may perform LBT 1308 and, if the channel is clear, transmit the control information 1310 in the time-frequency resources associated with the determined aggregation level using a particular MCS. The control information may be transmitted in PSCCH. DMRS 1312 may be transmitted with the control information.

The receiving device 1302 may determine an aggregation level 1314 of a plurality of aggregation levels associated with a PSCCH. In one example, the determination (1314) may occur after receiving the transmission of the control information 1310 (e.g. in a PSCCH) and may be based on blind decoding of the transmission (1316). In another example, the determination (1314) may occur after receiving the transmission of the control information 1310 and may be based on the LBT transmission 1308 preceding the control information (1318). In another example, the determination (1314) may occur after receiving the transmission of the control information 1310 and may be based on the DMRS 1312 (1320). In another example, the determination (1314) may occur after receiving the transmission of the control information 1310 and may be based on a resource pool configuration received before the control information (1322). Alternatively, the determination (1322) based on the resource pool configuration may occur before receiving the transmission of the control information 1310. Each aggregation level of the plurality of aggregation levels may be associated with a number of time-frequency resources dedicated for the PSCCH for a particular MCS used for modulating and coding control information in the PSCCH.

In one aspect, as discussed above, the control information may be determined by the receiving device 1302 through blind decoding (1316) Blind decoding may be performed by assuming different aggregation levels for the control information. The aggregation level may then be determined based on whether an assumed aggregation level successfully decodes the control information. The aggregation level may be determined after receiving the control information and after the blind decoding based on whether the control information is successfully decoded based on the assumed aggregation level.

In another aspect, an LBT sequence may indicate the aggregation level, and the aggregation level may be determined based on LBT (1318). For example, the LBT signal 1308 may be transmitted by the transmitting device 1304 before the control information 1310 in the PSCCH, and the LBT sequence may be received by the receiving device 1302 before receiving the control information 1310 in the PSCCH. The aggregation level may be determined by the receiving device 1302 based on the LBT signal that includes information indicating the aggregation level as discussed above.

In another aspect, the transmitting device 1304 may transmit the control information 1310 with DMRS 1312 indicating the aggregation level, and the aggregation level may be determined based on the DMRS (1320). For example, the DMRS 1312 may be received by the receiving device 1302 within the received control information 1310 in the time-frequency resources. The aggregation level may be determined based on the received DMRS as discussed above. For instance, the aggregation level may be determined based on a cyclic shift of the received DMRS.

In another aspect, the receiving device 1302 may determine an aggregation level based on previously identified resource pools (1322). For example, the receiving device 1302 may be provided a resource pool configuration before the transmitting device 1304 sends the control information 1310 using the resource pools. While FIG. 13 illustrates the receiving device 1302 making the determination (1322) after receiving the control information 1310, the receiving device 1302 may alternatively make the determination (1322)

before receiving the control information 1310. In such case, the aggregation level may be determined based on the particular time-frequency resources in which the control information will be received. The particular time-frequency resources may be one resource pool of a plurality of resource pools, and each resource in a pool of resources may be associated with an aggregation level.

After determining the aggregation level, the receiving device 1302 may decode the control information 1310 received in the time-frequency resources associated with the determined aggregation level (1324). The decoding may be based on the particular MCS associated with the determined aggregation level. For example, the receiving device 1302 may determine that the transmitting device 1304 encoded control information using an MCS mapped to an aggregation level of 2, as illustrated for example in FIG. 7. Based on this information, the receiving device 1302 may decode the control information 1310 to identify the SCI scheduling the PSSCH, and subsequently receives data from the transmitting device over PSSCH. The receiving device 1302 may then communicate with the transmitting device 1304 over PSSCH.

Figure 14:
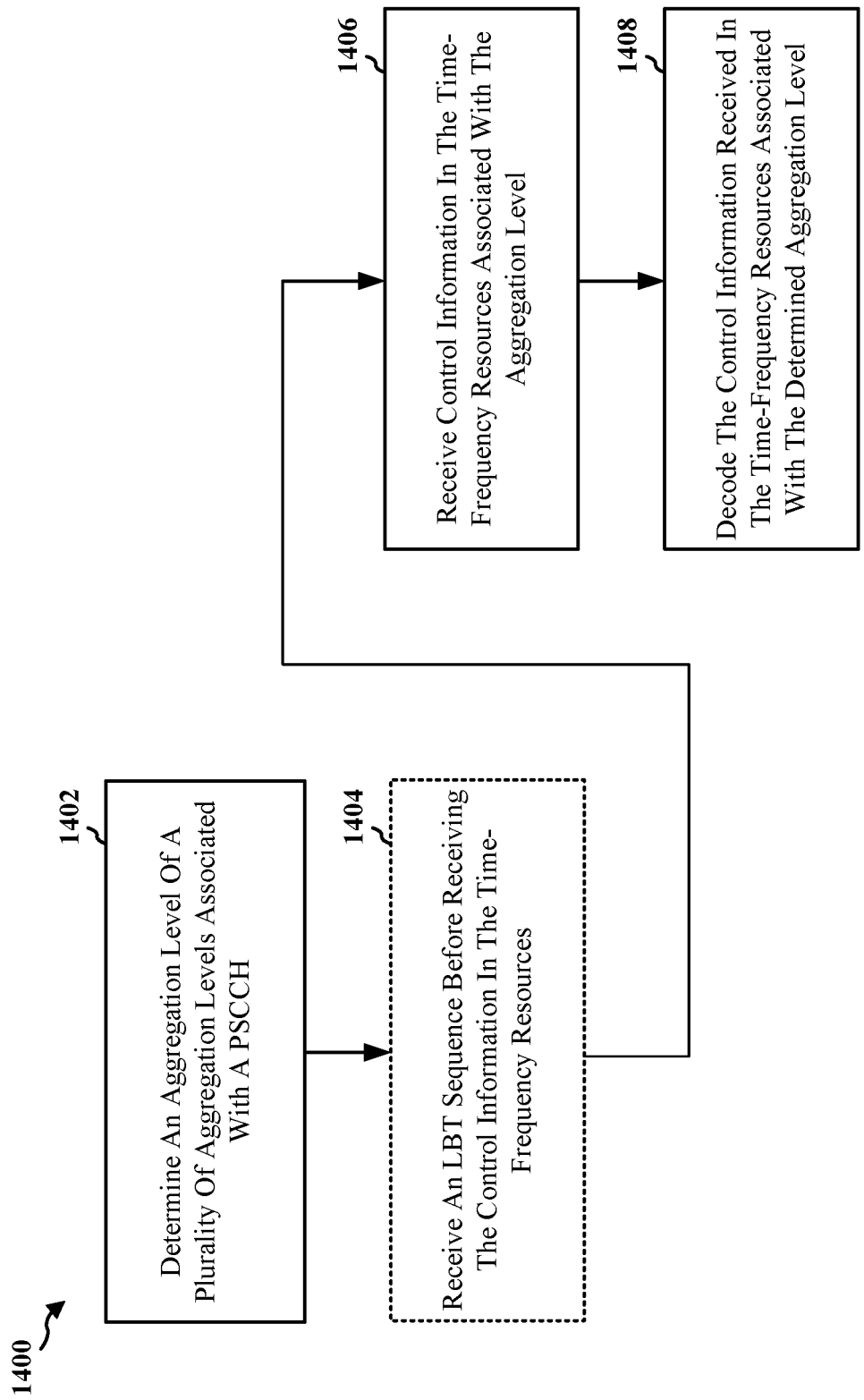
FIG. 14 is a flowchart of a method of wireless communication.

FIG. 14 is a flowchart 1400 of a method of wireless communication. The method may be performed by a receiving device (e.g., the UE 104, 350, 404, 406, 408, the receiving device 1302, the apparatus 1502/1502'; the processing system 1614, which may include memory and which may be an entire UE or a component of a UE). Optional aspects are illustrated with a dashed line. The method improves the ability of a receiving device to decode data received from a transmitting device using a variable-size control channel.

At 1402, the UE determines an aggregation level of a plurality of aggregation levels associated with a PSCCH. For example, 1402 may be performed by aggregation level determination component 1510 from FIG. 15. For example, referring to FIG. 13, the UE (e.g., the UE 104, 350, 1302) determines (1314) an aggregation level (e.g., the number of control blocks used, for example, as illustrated in FIGS. 6-12; in combination with the MCS used) of a plurality of aggregation levels (e.g., all the combinations of different numbers of control blocks and MCS used) associated with a PSCCH. Each aggregation level of the plurality of aggregation levels may be associated with a number of time-frequency resources (e.g. FIG. 2, FIGS. 6-12, NR-PSSCH) dedicated for the PSCCH (e.g., FIGS. 6-12, NR-PSSCH) and a particular MCS used for modulating and coding control information in the PSCCH.

The aggregation level may be determined based on the particular time-frequency resources in which the control information is received (for example, the location or locations of the control blocks 602, 616, 702, 716, 802, 816, 902, 916, 1002, 1016, 1102, 1116, 1202, 1216 of FIGS. 6-12 may indicate the aggregation level). The particular time-frequency resources (e.g. the time-frequency resources used for the aforementioned control blocks) may be one resource pool of a plurality of resource pools (e.g., time-frequency resources as illustrated in FIGS. 2 and 6-12). Each resource pool (e.g. time-frequency resources used for the aforementioned control blocks) may be associated with an aggregation level. For example, each aggregation level of the plurality of aggregation levels may be associated with a different number of time-frequency resources dedicated for the PSCCH (e.g. FIGS. 6-12, NR-PSSCH). In an aspect, the aggregation level and the associated time-frequency resources may be preconfigured in the UE (e.g., the UE 104, 350, the transmitting device 1304). In an aspect, a subset of allowed aggregation levels of the plurality of aggregation levels are preconfigured in the UE (e.g., the UE 104, 350, 1304).

At 1404, the UE receives an LBT sequence before receiving the control information in the time-frequency resources. For example, 1404 may be performed by LBT component 1506 from FIG. 15. For example, referring to FIGS. 6 and 7, the UE (e.g., the UE 104, 350, 1302) receives an LBT sequence (604, 614, 704, 714) before receiving the control information (602, 616, 702, 716, 802, 816, 902, 916, 1002, 1016, 1102, 1116, 1202, 1216 of FIGS. 6-12) in the time-frequency resources. Moreover, referring to FIG. 13, the LBT sequence (604, 614, 704, 714) may indicate the determined aggregation level. Accordingly, the aggregation level may be determined based on the LBT sequence (1318).

At 1406, the UE receives control information in the time-frequency resources associated with the aggregation level. For example, 1406 may be performed by control information component 1508 from FIG. 15. For example, referring to FIG. 13, the UE (e.g., the UE 104, 350, receiving device 1302) receives control information (1310) in the time-frequency resources associated with the aggregation level. In an aspect, a DMRS 1312 may be received within the received control information in the time-frequency resources. The aggregation level may be determined based on the received DMRS (1320). For example, the aggregation level may be determined based on a cyclic shift of the received DMRS. In an example, the time frequency resources used to transmit the received control information may be invulnerable to SINR variation.

At 1408, the UE decodes the control information received in the time-frequency resources associated with the determined aggregation level. For example, 1408 may be performed by decoder component 1512 from FIG. 15. For example, referring to FIG. 13, the UE (e.g., the UE 104, 350, 1302) decodes the control information received in the time-frequency resources associated with the determined aggregation level (1324). The decoding may be based on the particular MCS associated with the determined aggregation level.

Referring back to the blocks 1402, 1404, 1406 of FIG. 14 discussed above it may be noted that blocks 1402 and 1406 may occur in different orders. For example, for aggregation level determination based on blind decoding and DMRS, block 1406 may occur before block 1402. For instance, referring back to FIG. 13, for blind decoding, receiving control information 1310 may occur before determining the aggregation level (1316). Moreover, for DMRS, receiving control information 1310 may occur before determining the aggregation level (1320). Further, for aggregation level determination based on resource pools and LBT, block 1402 may occur before block 1406. For instance, referring back to FIG. 13 as described above, for resource pools, receiving control information 1310 may occur after determining the aggregation level (1322). For LBT, receiving control information 1310 may occur after determining the aggregation level (1318), where determining aggregation level (1318) is based on receiving the LBT 1308 in this case.

Figure 15:
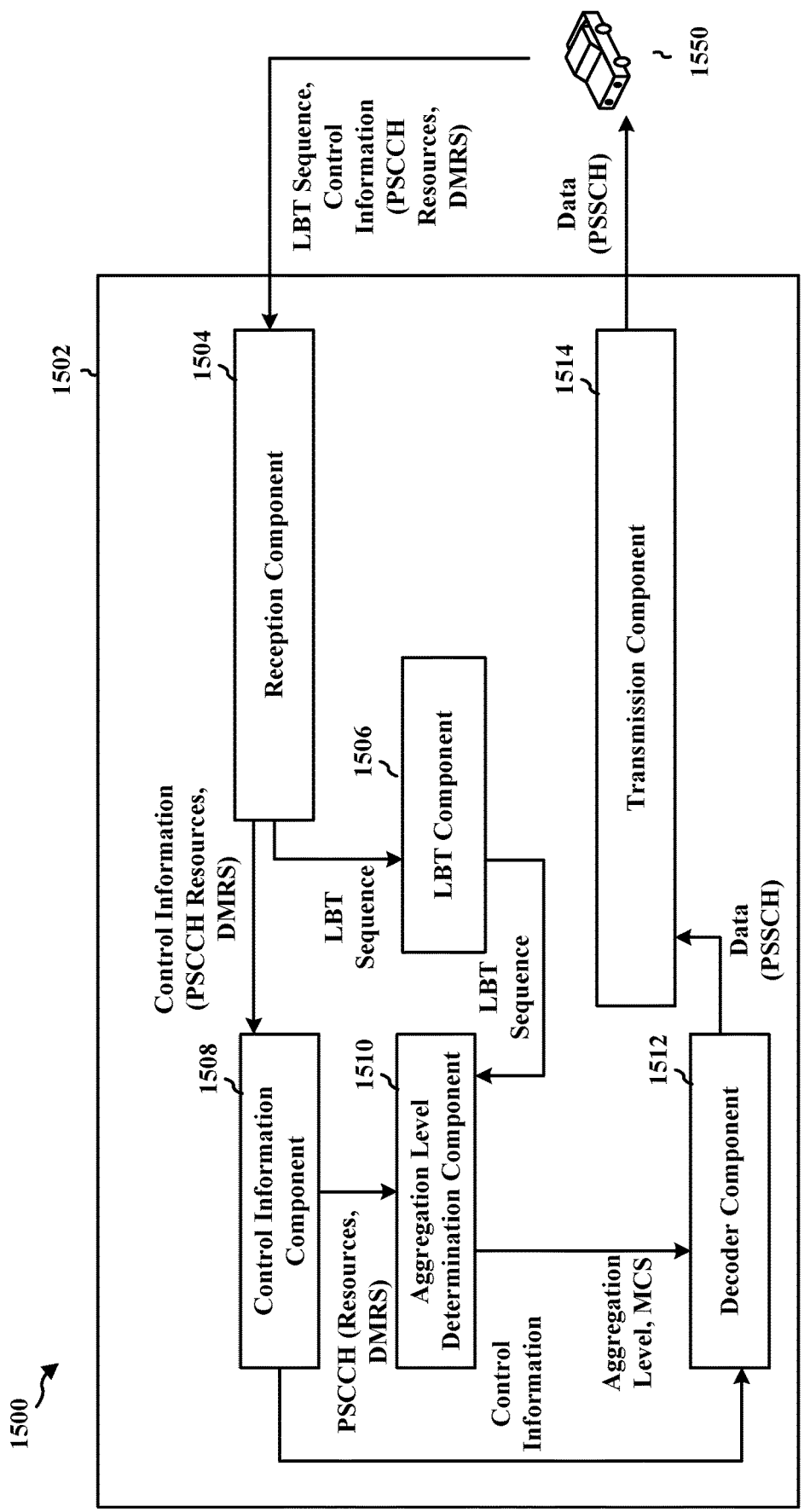
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a receiving device, e.g., UE 104, 350, 404, 406, 408, receiving device 1302, or a component of a UE 350. The apparatus includes a reception component 1504 that is configured to receive control information (e.g. PSCCH) and data (e.g. PSSCH) from a transmitting UE 1550, e.g. UE 104, 310, 402, transmitting device 1304. The apparatus includes an aggregation level determination component 1510 that is configured to determine an aggregation level of a plurality of aggregation levels associated with a physical sidelink control channel (PSCCH), each aggregation level of the plurality of aggregation levels being associated with a number of time-frequency resources dedicated for the PSCCH and a particular modulation and coding scheme (MCS) used for modulating and coding control information in the PSCCH. The apparatus includes a control information component 1508 that is configured to receive control information in the time-frequency resources associated with the aggregation level. The apparatus includes a decoder component 1512 that is configured to decode the control information received in the time-frequency resources associated with the determined aggregation level, the decoding being based on the particular MCS associated with the determined aggregation level. The apparatus includes a LBT component 1506 that is configured to receive a listen-before-talk (LBT) sequence before receiving the control information in the time-frequency resources, the LBT sequence indicating the determined aggregation level, the aggregation level being determined based on the LBT sequence that indicates the aggregation level. The apparatus also includes a transmission component 1514 that is configured to communicate data with the transmitting UE 1550.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
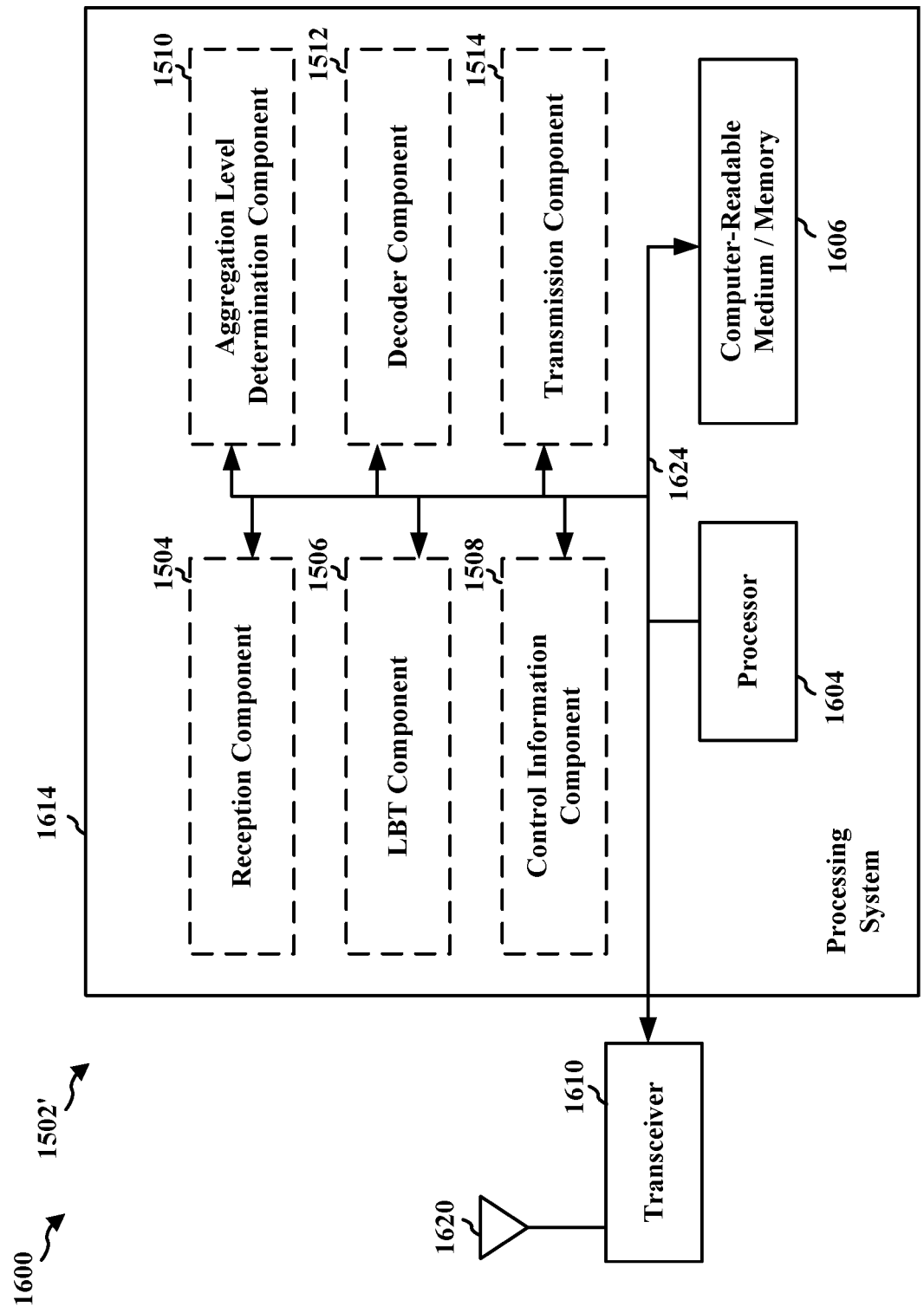
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514 and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1514, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514. The components may be software components running in the processor 1604, resident/stored in the computer readable medium/memory 1606, one or more hardware components coupled to the processor 1604, or some combination thereof. The processing system 1614 may be a component of the first transmitting device 310 or the second transmitting device 350 and may include the memory 376, 360 and/or at least one of the TX processor 316, 368, the RX processor 370, 356, and the controller/processor 375, 359. Alternatively, the processing system 1614 may be the entire UE (e.g., see device 310 or 350 of FIG. 3).

In one configuration, the apparatus 1502/1502' for wireless communication includes means for determining an aggregation level of a plurality of aggregation levels associated with a physical sidelink control channel (PSCCH), each aggregation level of the plurality of aggregation levels being associated with a number of time-frequency resources dedicated for the PSCCH and a particular modulation and coding scheme (MCS) used for modulating and coding control information in the PSCCH; means for receiving control information in the time-frequency resources associated with the aggregation level; and means for decoding the control information received in the time-frequency resources associated with the determined aggregation level, the decoding being based on the particular MCS associated with the determined aggregation level. The apparatus also includes means for receiving a listen-before-talk (LBT) sequence before receiving the control information in the time-frequency resources, the LBT sequence indicating the determined aggregation level, the aggregation level being determined based on the LBT sequence that indicates the aggregation level.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 17:
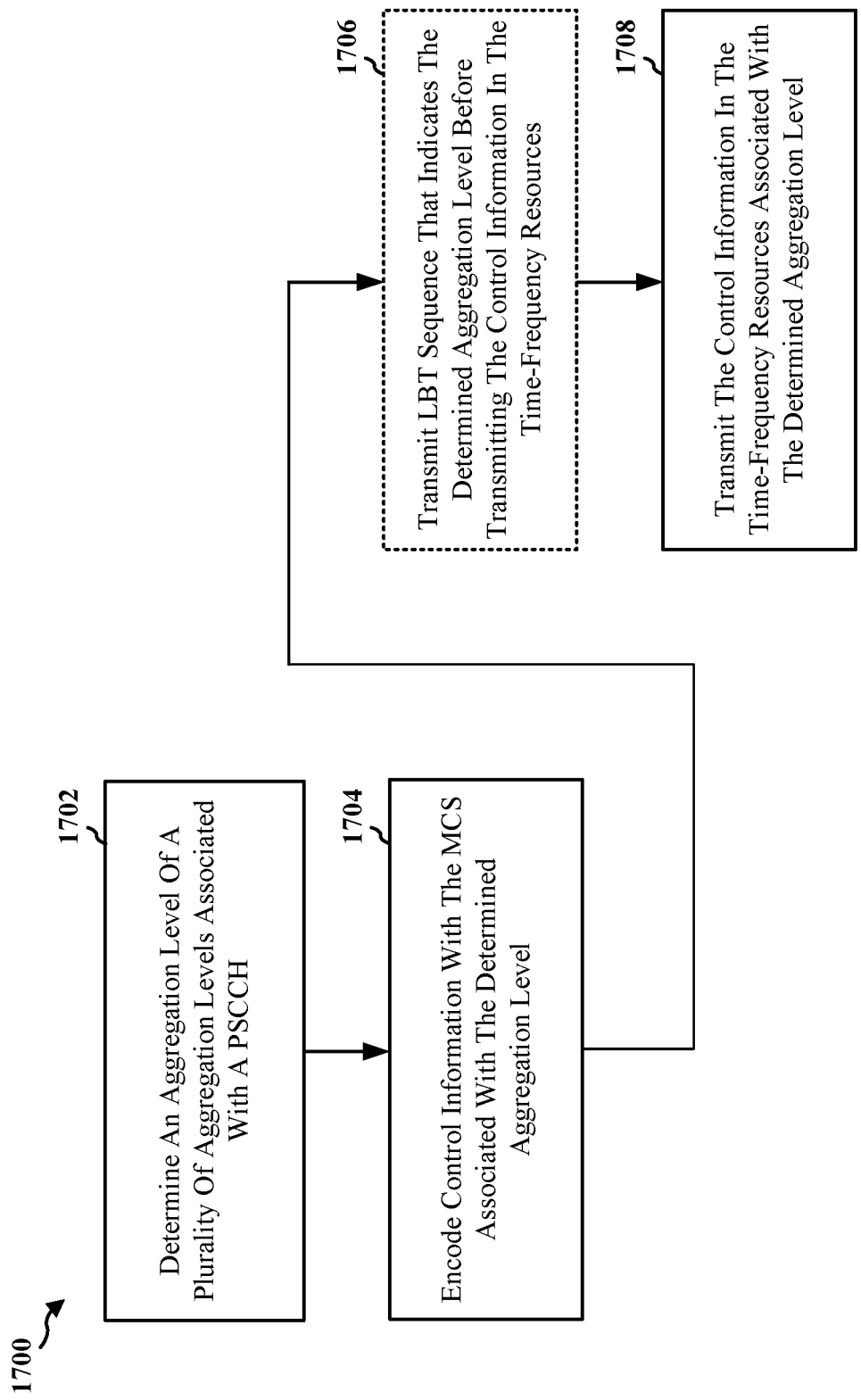
FIG. 17 is a flowchart of a method of wireless communication.

FIG. 17 is a flowchart 1700 of a method of wireless communication. The method may be performed by a transmitting device (e.g., the UE 104, 310, 402, the transmitting device 1304, the apparatus 1802/1802'; the processing system 1914, which may include memory and which may be an entire UE or a component of a UE). Optional aspects are illustrated with a dashed line. The method improves the ability of a transmitting device to provide control information to a receiving device based on a link budget in a variable control channel which may eliminate or minimize over-provisioning of resources for the control information.

At 1702, the UE determines an aggregation level of a plurality of aggregation levels associated with a PSCCH. For example, 1702 may be performed by aggregation level component 1804 from FIG. 18. For example, referring to FIG. 13, the UE (e.g., the UE 104, 350, 1304) determines (1306) an aggregation level (e.g., the number of control blocks used, for example, as illustrated in FIGS. 6-12; in combination with the MCS used) of a plurality of aggregation levels (e.g., all the combinations of different numbers of control blocks and MCS used) associated with a PSCCH. Each aggregation level of the plurality of aggregation levels may be associated with a number of time-frequency resources (e.g. FIG. 2, FIGS. 6-11, NR-PSSCH) dedicated for the PSCCH (e.g., FIGS. 6-12, NR-PSSCH) and a particular MCS used for modulating and coding control information in the PSCCH. In an aspect, the aggregation level and the associated time-frequency resources may be preconfigured in the UE (e.g., the UE 104, 350, 1304). In an aspect, a subset of allowed aggregation levels of the plurality of aggregation levels are preconfigured in the UE (e.g., the UE 104, 350, 1304).

At 1704, the UE encodes control information with the MCS associated with the determined aggregation level. For example, 1704 may be performed by encoder component 1806 from FIG. 18. For example, referring to FIG. 13, the UE (e.g., the UE 104, 350, 1304) encodes (1307) control information with the MCS associated with the determined aggregation level. For instance, the UE may determine that 64-QAM is associated with the aggregation level 1 (illustrated for example in FIG. 6), and therefore may encode the SCI in PSCCH based on 64-QAM. Alternatively, the UE may determine that 16-QAM is associated with the aggregation level 2 (illustrated for example in FIG. 7), and therefore may encode the SCI in PSCCH based on 16-QAM. The above MCS are merely examples; other MCS may be mapped to various aggregation levels.

At 1706, the UE transmits an LBT sequence that indicates the determined aggregation level before transmitting the control information in the time-frequency resources. For example, 1706 may be performed by LBT sequence component 1808 from FIG. 18. For example, referring to FIG. 13, the UE (e.g., the UE 104, 350, 1304) transmits an LBT sequence (1308) that indicates the determined aggregation level before transmitting the control information (1310) in the time-frequency resources. For example, when performing LBT, the UE (e.g. transmitting device 1304) may send a signal including a bit or other information that indicates the previously determined aggregation level.

At 1708, the UE transmits the control information in the time-frequency resources associated with the determined aggregation level. For example, 1708 may be performed by control component 1810 from FIG. 18. For example, referring to FIG. 13, the UE (e.g., the UE 104, 350, transmitting device 1304) transmits the control information (1310) in the time-frequency resources associated with the determined aggregation level. The time-frequency resources may span one or more symbols and one or more sub-channels depending on the aggregation level (as illustrated, for example, by control blocks 602, 616, 702, 716, 802, 816, 902, 916, 1002, 1016, 1102, 1116, 1202, 1216 of FIGS. 6-12). In an example, the time frequency resources used for transmission of control information may be invulnerable to SINR variation. In an aspect, the UE 104, 350, 1304 may transmit a DMRS 1312 within the control information 1310 in the time-frequency resources. The DMRS may indicate the determined aggregation level. For example, a cyclic shift to the DMRS may be used to indicate the determined aggregation level.

Referring back to the blocks 1702, 1706, 1708 of FIG. 17 discussed above it may be noted that, unlike the corresponding discussion of FIG. 14, block 1702 generally occurs before block 1708. For instance, referring back to FIG. 13, determining an aggregation level 1306 may occur before transmission of the control information 1310.

Figure 18:
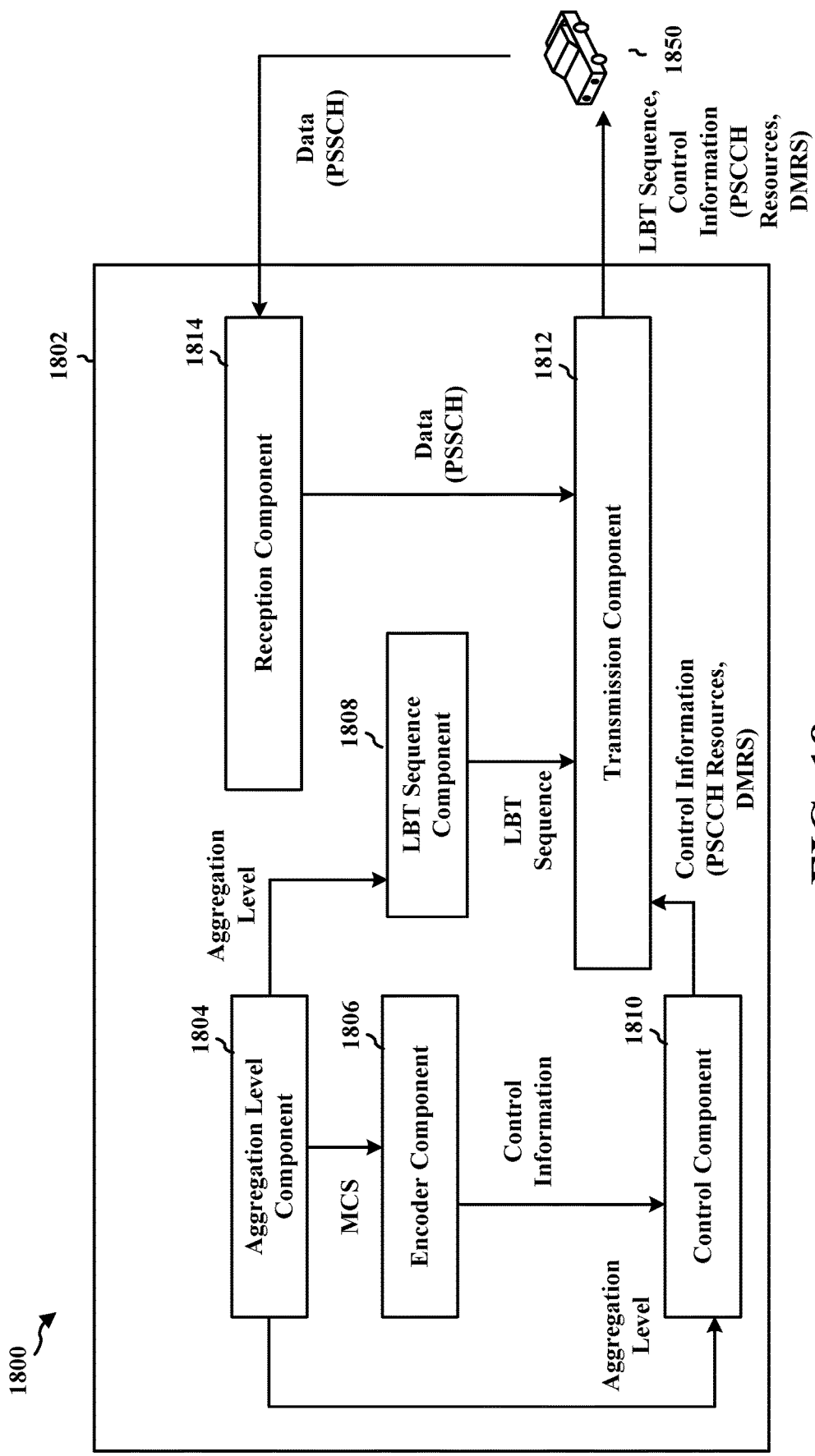
FIG. 18 is a conceptual data flow diagram illustrating the data flow between different means/components in an example apparatus.

FIG. 18 is a conceptual data flow diagram 1800 illustrating the data flow between different means/components in an example apparatus 1802. The apparatus may be a transmitting device, e.g., UE 104, 310, 402, transmitting device 1304, or a component of a UE 310. The apparatus includes a transmission component 1812 that is configured to transmit control information (e.g. PSCCH) and data (e.g. PSSCH) to a receiving UE 1850, e.g. UE 104, 350, 404, 406, 408, receiving device 1302. The apparatus includes an aggregation level component 1804 that is configured to determine an aggregation level of a plurality of aggregation levels associated with a physical sidelink control channel (PSCCH), each aggregation level of the plurality of aggregation levels being associated with a number of time-frequency resources dedicated for the PSCCH and a particular modulation and coding scheme (MCS) used for modulating and coding control information in the PSCCH. The apparatus includes an encoder component 1806 that is configured to encode control information with the MCS associated with the determined aggregation level. The apparatus includes a control component 1810 that is configured to transmit the control information in the time-frequency resources associated with the determined aggregation level. The apparatus includes a LBT sequence component 1808 that is configured to transmit a listen-before-talk (LBT) sequence that indicates the determined aggregation level before transmitting the control information in the time-frequency resources. The apparatus includes a reception component 1814 that is configured to receive data from the receiving UE 1850.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
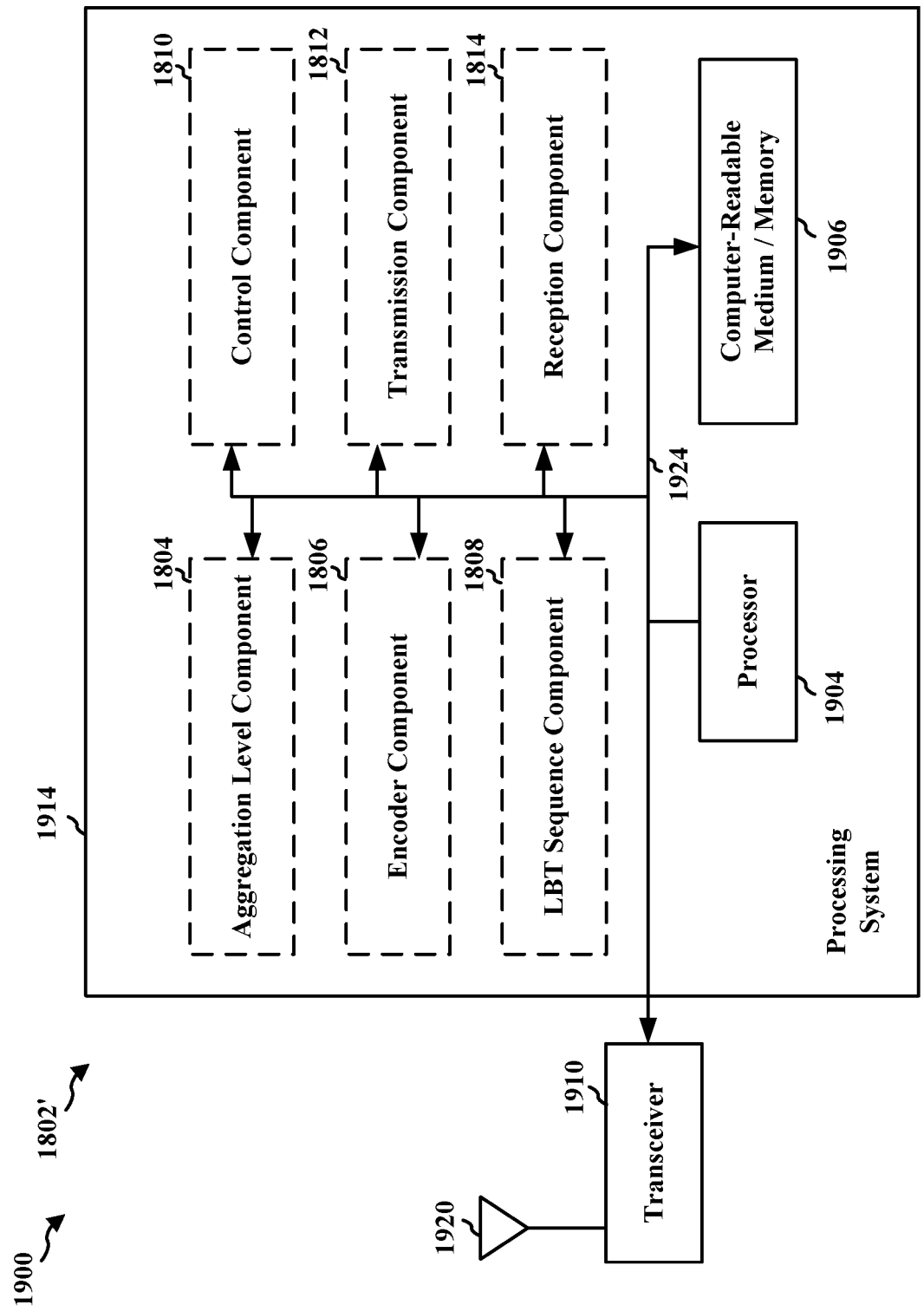
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814 and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1814. In addition, the transceiver 1910 receives information from the processing system 1914, specifically the transmission component 1812, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814. The components may be software components running in the processor 1904, resident/stored in the computer readable medium/memory 1906, one or more hardware components coupled to the processor 1904, or some combination thereof. The processing system 1914 may be a component of the first transmitting device 310 or the second transmitting device 350 and may include the memory 376, 360 and/or at least one of the TX processor 316, 368, the RX processor 370, 356, and the controller/processor 375, 359. Alternatively, the processing system 1914 may be the entire UE (e.g., see device 310 or 350 of FIG. 3).

In one configuration, the apparatus 1802/1802' for wireless communication includes means for determining an aggregation level of a plurality of aggregation levels associated with a physical sidelink control channel (PSCCH), each aggregation level of the plurality of aggregation levels being associated with a number of time-frequency resources dedicated for the PSCCH and a particular modulation and coding scheme (MCS) used for modulating and coding control information in the PSCCH; means for encoding control information with the MCS associated with the determined aggregation level; and means for transmitting the control information in the time-frequency resources associated with the determined aggregation level. The apparatus also includes means for transmitting a listen-before-talk (LBT) sequence that indicates the determined aggregation level before transmitting the control information in the time-frequency resources.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining an aggregation level of a plurality of aggregation levels associated with a physical sidelink control channel (PSCCH), each different aggregation level of the plurality of aggregation levels being associated with a different, particular number of time-frequency resources dedicated for the PSCCH and a different, particular modulation and coding scheme (MCS) used for modulating and coding sidelink control information (SCI) in the PSCCH;
   receiving SCI in the time-frequency resources associated with the aggregation level; and
   decoding the SCI received in the time-frequency resources of the PSCCH associated with the determined aggregation level, the decoding being based on the particular MCS associated with the determined aggregation level.

2. The method of claim 1, wherein the particular MCS associated with each aggregation level of the plurality of aggregation levels allows SCI to be coded into the particular number of time-frequency resources associated with the aggregation level.

3. The method of claim 1, wherein the SCI is decoded through blind decoding by assuming different aggregation levels for the SCI, and the aggregation level is determined after receiving the SCI and after the blind decoding based on whether the SCI is successfully decoded based on the assumed aggregation level.

4. The method of claim 1, further comprising receiving a listen-before-talk (LBT) sequence before receiving the SCI in the time-frequency resources, the LBT sequence indicating the determined aggregation level, the aggregation level being determined based on the LBT sequence that indicates the aggregation level.

5. The method of claim 1, wherein demodulation reference signals (DMRS) are received within the SCI in the time-frequency resources, wherein the aggregation level is determined based on the received DMRS.

6. The method of claim 5, wherein the aggregation level is determined based on a cyclic shift of the received DMRS.

7. The method of claim 1, wherein the aggregation level is determined based on the particular time-frequency resources in which the SCI is received, the particular time-frequency resources being one resource pool of a plurality of resource pools, each resource pool being associated with an aggregation level.

8. The method of claim 1, wherein the aggregation level and the associated time-frequency resources are preconfigured in the UE.

9. The method of claim 1, wherein a subset of allowed aggregation levels of the plurality of aggregation levels are preconfigured in the UE.

10. A method of wireless communication of a user equipment (UE), comprising:
  determining an aggregation level of a plurality of aggregation levels associated with a physical sidelink control channel (PSCCH), each different aggregation level of the plurality of aggregation levels being associated with a different, particular number of time-frequency resources dedicated for the PSCCH and a different, particular modulation and coding scheme (MCS) used for modulating and coding sidelink control information (SCI) in the PSCCH;
  encoding SCI with the MCS associated with the determined aggregation level; and
  transmitting the SCI in the time-frequency resources associated with the determined aggregation level.

11. The method of claim 10, wherein the particular MCS associated with each aggregation level of the plurality of aggregation levels allows SCI to be coded into the particular number of time-frequency resources associated with the aggregation level.

12. The method of claim 10, further comprising transmitting a listen-before-talk (LBT) sequence that indicates the determined aggregation level before transmitting the SCI in the time-frequency resources.

13. The method of claim 10, wherein demodulation reference signals (DMRS) are transmitted within the SCI in the time-frequency resources, wherein the DMRS indicates the determined aggregation level.

14. The method of claim 13, wherein a cyclic shift is applied to the DMRS, wherein the aggregation level is indicated through the cyclic shift of the DMRS.

15. The method of claim 10, wherein the time-frequency resources are invulnerable to signal-to-interference plus noise ratio (SINR) variation.

16. A user equipment (UE), comprising:
  a memory; and
  at least one processor coupled to the memory and configured to:
    determine an aggregation level of a plurality of aggregation levels associated with a physical sidelink control channel (PSCCH), each different aggregation level of the plurality of aggregation levels being associated with a different, particular number of time-frequency resources dedicated for the PSCCH and a different, particular modulation and coding scheme (MCS) used for modulating and coding sidelink control information (SCI) in the PSCCH;
    receive SCI in the time-frequency resources associated with the aggregation level; and
    decode the SCI received in the time-frequency resources of the PSCCH associated with the determined aggregation level, the decoding being based on the particular MCS associated with the determined aggregation level.

17. The UE of claim 16, wherein the particular MCS associated with each aggregation level of the plurality of aggregation levels allows SCI to be coded into the particular number of time-frequency resources associated with the aggregation level.

18. The UE of claim 16, wherein the SCI is decoded through blind decoding by assuming different aggregation levels for the SCI, and the aggregation level is determined after receiving the SCI and after the blind decoding based on whether the SCI is successfully decoded based on the assumed aggregation level.

19. The UE of claim 16, wherein the at least one processor is further configured to receive a listen-before-talk (LBT) sequence before receiving the SCI in the time-frequency resources, the LBT sequence indicating the determined aggregation level, the aggregation level being determined based on the LBT sequence that indicates the aggregation level.

20. The UE of claim 16, wherein the at least one processor is further configured to receive demodulation reference signals (DMRS) within the received SCI in the time-frequency resources, and the aggregation level is determined based on the received DMRS.

21. The UE of claim 20, wherein the aggregation level is determined based on a cyclic shift of the received DMRS.

22. The UE of claim 16, wherein the aggregation level is determined based on the particular time-frequency resources in which the SCI is received, the particular time-frequency resources being one resource pool of a plurality of resource pools, each resource pool being associated with an aggregation level.

23. The UE of claim 16, wherein the aggregation level and the associated time-frequency resources are preconfigured in the UE.

24. The UE of claim 16, wherein a subset of allowed aggregation levels of the plurality of aggregation levels are preconfigured in the UE.

25. A user equipment (UE), comprising:
  a memory; and
  at least one processor coupled to the memory and configured to:
    determine an aggregation level of a plurality of aggregation levels associated with a physical sidelink control channel (PSCCH), each different aggregation level of the plurality of aggregation levels being associated with a different, particular number of time-frequency resources dedicated for the PSCCH and a different, particular modulation and coding scheme (MCS) used for modulating and coding sidelink control information (SCI) in the PSCCH;
    encode SCI with the MCS associated with the determined aggregation level; and
    transmit the SCI in the time-frequency resources associated with the determined aggregation level.

26. The UE of claim 25, wherein the particular MCS associated with each aggregation level of the plurality of aggregation levels allows SCI to be coded into, the particular number of time-frequency resources associated with the aggregation level.

27. The UE of claim 25, wherein the at least one processor is further configured to transmit a listen-before-talk (LBT) sequence that indicates the determined aggregation level before transmitting the SCI in the time-frequency resources.

28. The UE of claim 25, wherein the at least one processor is further configured to transmit demodulation reference signals (DMRS) within the SCI in the time-frequency resources, wherein the DMRS indicates the determined aggregation level.

29. The UE of claim 28, wherein a cyclic shift is applied to the DMRS, wherein the aggregation level is indicated through the cyclic shift of the DMRS.

30. The UE of claim 25, wherein the time frequency resources are invulnerable to signal-to-interference plus noise ratio (SINR) variation.

\* \* \* \* \*